United States Patent
Oigawa et al.

(10) Patent No.: US 11,506,148 B2
(45) Date of Patent: Nov. 22, 2022

(54) MECHANISM FOR OPENING/CLOSING INTAKE MEMBER

(71) Applicant: HONDA MOTOR CO., LTD., Tokyo (JP)

(72) Inventors: Yuji Oigawa, Saitama (JP); Yusuke Ninomiya, Saitama (JP); Tetsuya Ogawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 13 days.

(21) Appl. No.: 16/771,222

(22) PCT Filed: Jul. 24, 2019

(86) PCT No.: PCT/JP2019/029008
§ 371 (c)(1),
(2) Date: Jun. 10, 2020

(87) PCT Pub. No.: WO2021/014609
PCT Pub. Date: Jan. 28, 2021

(65) Prior Publication Data
US 2021/0404421 A1 Dec. 30, 2021

(51) Int. Cl.
*F02M 1/02* (2006.01)
*F02M 35/02* (2006.01)
*F02M 35/10* (2006.01)

(52) U.S. Cl.
CPC .......... *F02M 1/02* (2013.01); *F02M 35/0209* (2013.01); *F02M 35/1017* (2013.01); *F02M 35/10196* (2013.01)

(58) Field of Classification Search
CPC .. F02M 1/02; F02M 35/0209; F02M 35/1017; F02M 35/10196
See application file for complete search history.

(56) References Cited

U.S. PATENT DOCUMENTS

| 2,908,263 A | * | 10/1959 | Brown | F02D 11/02 123/395 |
| 4,834,784 A | * | 5/1989 | Bidanset | F02M 35/02 261/64.6 |

(Continued)

FOREIGN PATENT DOCUMENTS

| JP | H0195558 U | 6/1989 |
| JP | 2001090608 A | 4/2001 |

(Continued)

OTHER PUBLICATIONS

Extended European Search Report issued in the EP Patent Application No. EP19891686.8, dated Sep. 28, 2020.

*Primary Examiner* — Kurt Philip Liethen
(74) *Attorney, Agent, or Firm* — CKC & Partners Co., LLC

(57) ABSTRACT

Provided is an opening/closing mechanism for an intake member which enables backlash suppression a working member and positioning of a choke lever. The opening/closing mechanism includes the intake member that accommodates a filter part and has an opening leading to a carburetor at an end wall portion facing the filter part; an opening/closing member that is disposed between the filter part and the end wall portion, and opens and closes the opening; and a working member that is disposed on a side opposite to the opening/closing member with the end wall portion interposed therebetween. The working member includes an arm portion that extends along the end wall portion and is coupled with the opening/closing member at one end by sandwiching the end wall portion therebetween, and a holding portion that is provided at the other end of the arm portion, the intake member has a guide hole into which the arm portion is inserted to guide movement of the arm portion, the guide hole has a first fixing portion that fixes the arm portion on one side in a movement direction of the arm (Continued)

portion, and a second fixing portion that fixes the arm portion on the other side in the movement direction of the arm portion, and widths of the first fixing portion and the second fixing portion of the guide hole are respectively equal to or less than a width of the arm portion.

11 Claims, 29 Drawing Sheets

(56) References Cited

U.S. PATENT DOCUMENTS

| | | | |
|---|---|---|---|
| 4,895,114 A | 1/1990 | Iida et al. | |
| 2001/0008132 A1 | 7/2001 | Ikeda et al. | |
| 2003/0037749 A1* | 2/2003 | Imafuku | F02M 35/10196 |
| | | | 123/376 |
| 2005/0022798 A1 | 2/2005 | Roth et al. | |
| 2007/0199534 A1* | 8/2007 | Rockwell | F02D 41/064 |
| | | | 123/179.16 |
| 2012/0161342 A1* | 6/2012 | Shebuski | F02M 7/24 |
| | | | 261/64.6 |
| 2015/0285197 A1* | 10/2015 | Mutoh | F02M 35/10144 |
| | | | 123/184.21 |
| 2016/0138507 A1* | 5/2016 | Klassen | F02D 41/0002 |
| | | | 123/198 E |
| 2017/0167412 A1* | 6/2017 | Ishikawa | F02M 1/02 |
| 2017/0319998 A1* | 11/2017 | Girondi | B01D 46/88 |
| 2018/0320644 A1* | 11/2018 | Bartl | F02M 35/088 |
| 2020/0025162 A1* | 1/2020 | Niakan | B01D 46/0012 |

FOREIGN PATENT DOCUMENTS

| | | |
|---|---|---|
| JP | 2001200735 A | 7/2001 |
| JP | 2007056758 A | 3/2007 |
| WO | 2020178986 A1 | 9/2020 |

* cited by examiner

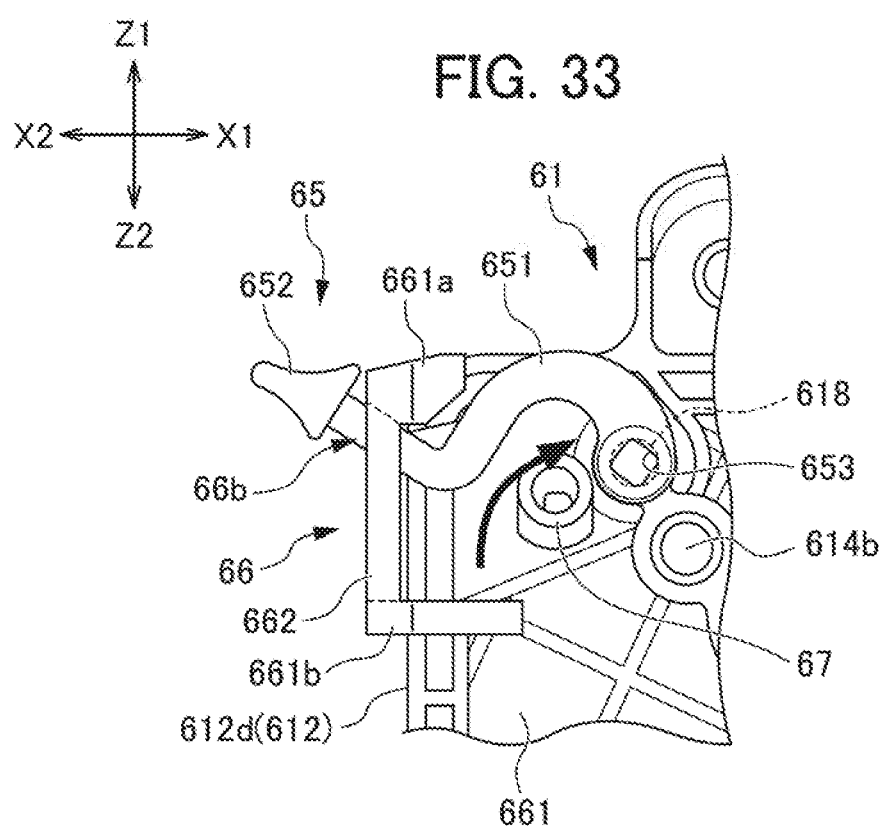

MECHANISM FOR OPENING/CLOSING INTAKE MEMBER

TECHNICAL FIELD

The present invention relates to a mechanism for opening/closing an intake member.

BACKGROUND ART

Conventionally, a general-purpose engine used as a drive source for a small working machine such as a string trimmer is known, for example. In such a weed trimmer, a general-purpose engine is mounted to the base end of a drive shaft with a blade mounted to the tip. The general-purpose engine is a two-stroke or four-stroke engine that burns a mixture of fuel and air to drive a piston. An air cleaner for intake to the carburetor is provided in such a general-purpose engine (see for example Japanese Patent No. 6,386,438).

The air cleaner feeds, for example, intake air (air) which has passed through an air filter accommodated in an air cleaner case to the carburetor through an opening provided in an end wall portion of the air cleaner case. Here, the opening/closing mechanism for adjusting the fuel ratio relative to the intake air by adjusting the amount of intake air supplied to the carburetor by opening and closing the opening is provided in the air cleaner case. The opening/closing mechanism is disposed, for example, on the air filter side at the end wall of the air cleaner case. The opening/closing mechanism includes a choke valve which is an opening/closing member for opening and closing an opening leading to the carburetor, and the opening/closing mechanism further includes a choke lever which is a working member disposed on the opposite side of the air filter at the end wall portion of the air cleaner case to operate the choke valve.

The choke lever integrally includes a holding portion extending along the end wall portion toward the side of the air cleaner case, and the holding portion is held by picking up when it is moved in one direction (e.g., vertical direction) by the hand (fingers) of the operator. Generally, the holding portion is provided to be wider than the arm portion of the choke lever, and is integrally molded with the arm portion by, for example, resin.

Patent Document 1: Japanese Patent No. 6386438

DISCLOSURE OF THE INVENTION

Problems to be Solved by the Invention

In order to perform the movement operation of the choke lever stably, it is desirable to guide the movement operation of the choke lever along the guide hole and perform positioning by providing a thin slit-shaped guide hole in the air cleaner case, and inserting the arm portion of the choke lever into the guide hole. In this case, the choke lever is mounted to the air cleaner case by inserting the arm portion from the end opposite to the holding portion into the guide hole.

In order to configure so as to be able to smoothly perform the insertion into the guide hole of the choke lever, it is necessary for the width of at least a portion of the guide hole (the width perpendicular to the movement operation direction of the choke lever) to be larger than the width of the arm portion of the choke lever (the width perpendicular to the movement operation direction of the choke lever). For this reason, there is a gap in the width direction between the choke lever and the guide hole after assembly. Due to the presence of this gap, there is a problem in that the choke lever rattles due to vibration when the general-purpose engine is driven. As a result, the choke lever or the guide hole is worn from long-term use, and thus, there is concern that the positioning of the choke lever becomes imperfect.

The present invention has been made in view of the above, and an object thereof is to provide an opening/closing mechanism for an intake member which enables backlash suppression and positioning of a working member.

Means for Solving the Problems

A first aspect of the present invention provides an opening/closing mechanism (for example, an opening/closing mechanism 6A described later) of an intake member comprising: the intake member (for example, an air cleaner case 61 described later) that accommodates a filter part (for example, an air filter 62 described later) and has an opening (for example, an opening 613 described later) leading to a carburetor (for example, a carburetor 60 described later) at an end wall portion (for example, an end wall portion 611 described later) facing the filter part; an opening/closing member (for example, a choke valve 64 described later) that is disposed between the filter part and the end wall portion, and opens and closes the opening; and a working member (for example, a choke lever 65 described later) that is disposed on a side opposite to the opening/closing member with the end wall portion interposed therebetween, in which the working member includes an arm portion (for example, an arm portion 651 described later) that extends along the end wall portion and is coupled with the opening/closing member at one end (for example, one end portion 651$c$ described later) by sandwiching the end wall portion therebetween, and a holding portion (for example, a holding portion 652 described later) that is provided at the other end (for example, other end portion 651$d$ described later) of the arm portion, the intake member has a guide hole (for example, a guide hole 66 described later) into which the arm portion is inserted to guide movement of the arm portion, the guide hole has a first fixing portion (for example, a first fixing portion 663 described later) that fixes the arm portion on one side (for example, the direction Z2 side described later) in a movement direction of the arm portion, and a second fixing portion (for example, a second fixing portion 664 described later) that fixes the arm portion on the other side (for example, the direction Z1 side described later) in the movement direction of the arm portion, and widths of the first fixing portion and the second fixing portion of the guide hole are respectively equal to or less than a width of the arm portion.

According to the above first aspect, when the movement operation is guided by the guide hole, the working member is fixed by being sandwiched by the first fixing portion and the second fixing portion having a width equal to or less than the width of the arm portion on one side and the other side in the moving direction of the arm portion, respectively. Therefore, it is possible to suppress the backlash of the working member, and possible to position the working member.

According to a second aspect of the present invention, in the opening/closing mechanism of the intake member according to the first aspect, the guide hole may include a wide portion (for example, a wide portion 665 described later) having a length (for example, a length B described later) equal to or greater than a length (for example, a length D described later) of the arm portion along a length direction of the guide hole between the first fixing portion and the second fixing portion, and having a width (for example, a width E described later) greater than a width (for example, a width B described later) of the arm portion.

According to the above second aspect, the arm portion of the working member can be inserted into the guide hole by using the wide portion. Therefore, the assembling property of the working member is improved.

According to a third aspect of the present invention, in the opening/closing mechanism of the intake member according to the second aspect, the width of the wide portion may be equal to or less than twice the width of the arm portion.

According to the above third aspect, it is possible to prevent the entire arm portion from completely entering the wide portion during the movement operation of the working member.

According to a fourth aspect of the present invention, in the opening/closing mechanism of the intake member according to the third or fourth aspect, the wide portion may include a first sloped portion (for example, a first sloped portion 665b described later) that couples a maximum width part (for example, a maximum width portion 665a described later) of the wide portion with the first fixing portion, and a second sloped portion (for example, a second sloped portion 665c described later) that couples the maximum width part of the wide portion with the second fixing portion.

According to the above fourth aspect, it is possible to reduce the resistance when the arm portion moves toward the first fixing portion and the second fixing portion from within the wide portion by the first sloped portion and the second sloped portion. Therefore, it is possible to perform a smooth movement operation of the operation member.

According to a fifth aspect of the present invention, in the opening/closing mechanism of the intake member according to the fourth aspect, a length (for example, a length G described later) of the maximum wide part along the length direction of the guide hole may be shorter than the length of the arm portion along the length direction of the guide hole.

According to the above fifth aspect, it is possible to prevent the arm portion from completely fitting into the maximum width portion in the wide portion. Therefore, it is possible to perform a smooth movement operation of the working member.

According to a sixth aspect of the present invention, in the opening/closing mechanism of the intake member according to the fourth or fifth aspect, an angle (for example, an angle θ1 described later) formed by the first fixing portion and the first sloped portion, and an angle (for example, an angle θ2 described later) formed by the second fixing portion and the second sloped portion may be respectively larger than 90°.

According to the above sixth aspect, it is possible to further reduce the resistance when the arm portion moves from the inside of the wide portion to the first fixing portion and the second fixing portion. Therefore, the operability of the working member is further improved.

According to a seventh aspect of the present invention, in the opening/closing mechanism of the intake member according to any one of the fourth to sixth aspects, the angle formed by the first fixing portion and the first sloped portion, and the angle formed by the second fixing portion and the second sloped portion may differ from each other.

According to the above seventh aspect, it is possible to change the resistance when the arm portion moves from the inside of the wide portion to the first fixing portion and the second fixing portion, separately. Therefore, it is possible to instinctively identify in which direction of the guide hole the working member has moved.

According to an eighth aspect of the present invention, in the opening/closing mechanism of the intake member according to any one of the first to seventh aspects, a length (for example, a length F1 and/or F2 described later) of the first fixing portion and/or the second fixing portion along the length direction of the guide hole may be equal to or less than the length of the arm portion along the length direction of the guide hole.

According to the above eighth aspect, the guide hole can be formed as small as possible while the arm portion is sandwiched by and fixed to the first fixing portion and/or the second fixing portion. Therefore, it is possible to reduce the size of the intake member.

According to a ninth aspect of the present invention, in the opening/closing mechanism of the intake member according to the eighth aspect, the length of the first fixing portion or the second fixing portion along the length direction of the guide hole may be equal to the length of the arm portion along the length direction of the guide hole.

According to the above ninth aspect, it can be easily visually confirmed that the arm portion has moved to the first fixing portion or the second fixing portion.

According to a tenth aspect of the present invention, in the opening/closing mechanism of the intake member according to the eighth aspect, the lengths of the first fixing portion and the second fixing portion along the length direction of the guide hole may be equal to the length of the arm portion along the length direction of the guide hole.

According to the above tenth aspect, it can be easily visually confirmed that the arm portion has moved to the first fixing portion and the second fixing portion, respectively.

Effects of the Invention

According to the present invention, it is possible to provide an opening/closing mechanism for an intake member which enables backlash suppression and positioning of a working member.

BRIEF DESCRIPTION OF THE DRAWINGS

FIG. 33 is a diagram for explaining a step of mounting the working member to the guide hole of the intake member according to the embodiment of the present invention.

PREFERRED MODE FOR CARRYING OUT THE INVENTION

Hereinafter, an embodiment of the present invention will be described in detail with reference to the drawings.

Figure 1:
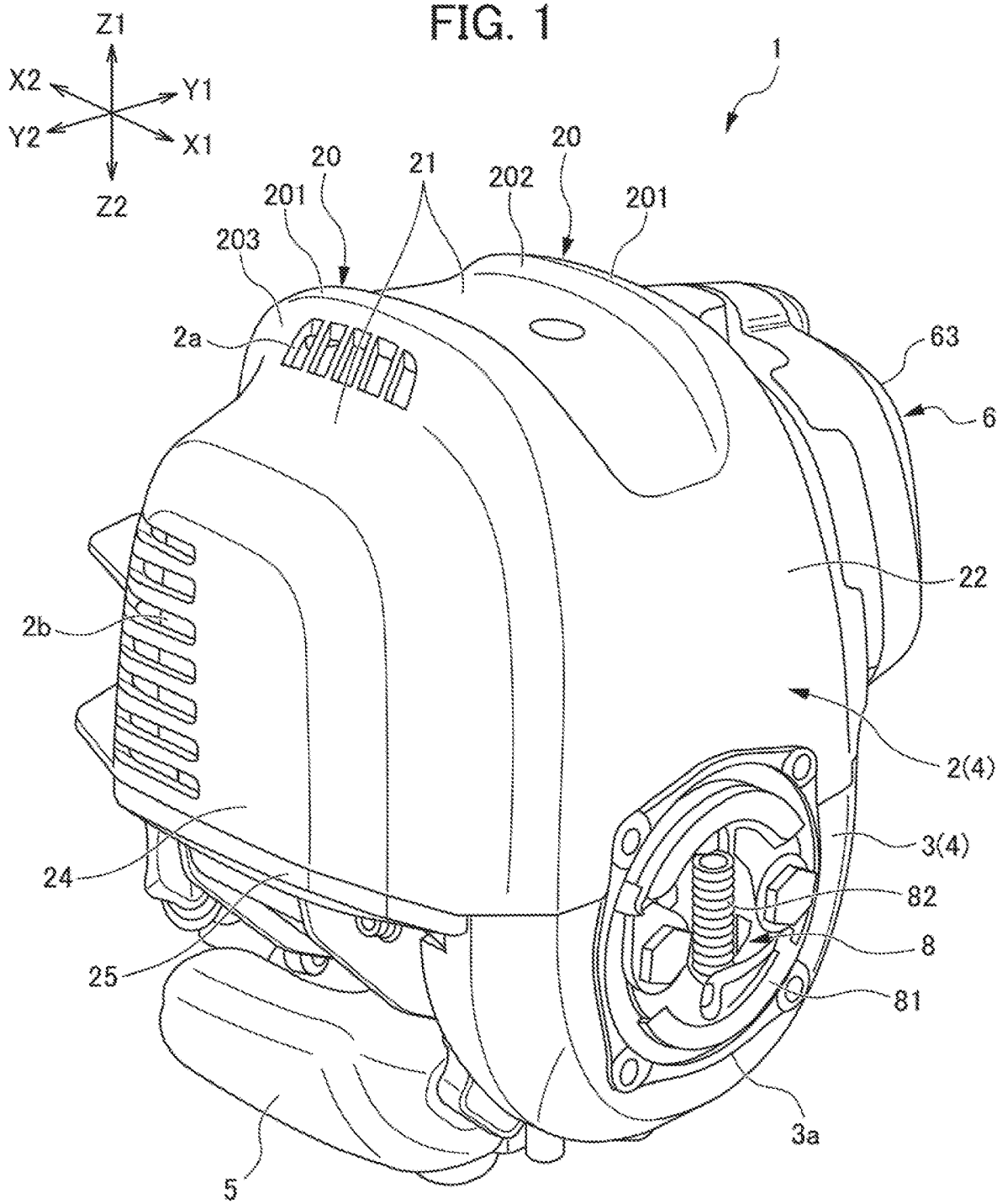
FIG. 1 is a front perspective view of a general-purpose engine having an intake member according to an embodiment of the present invention.
Figure 2:
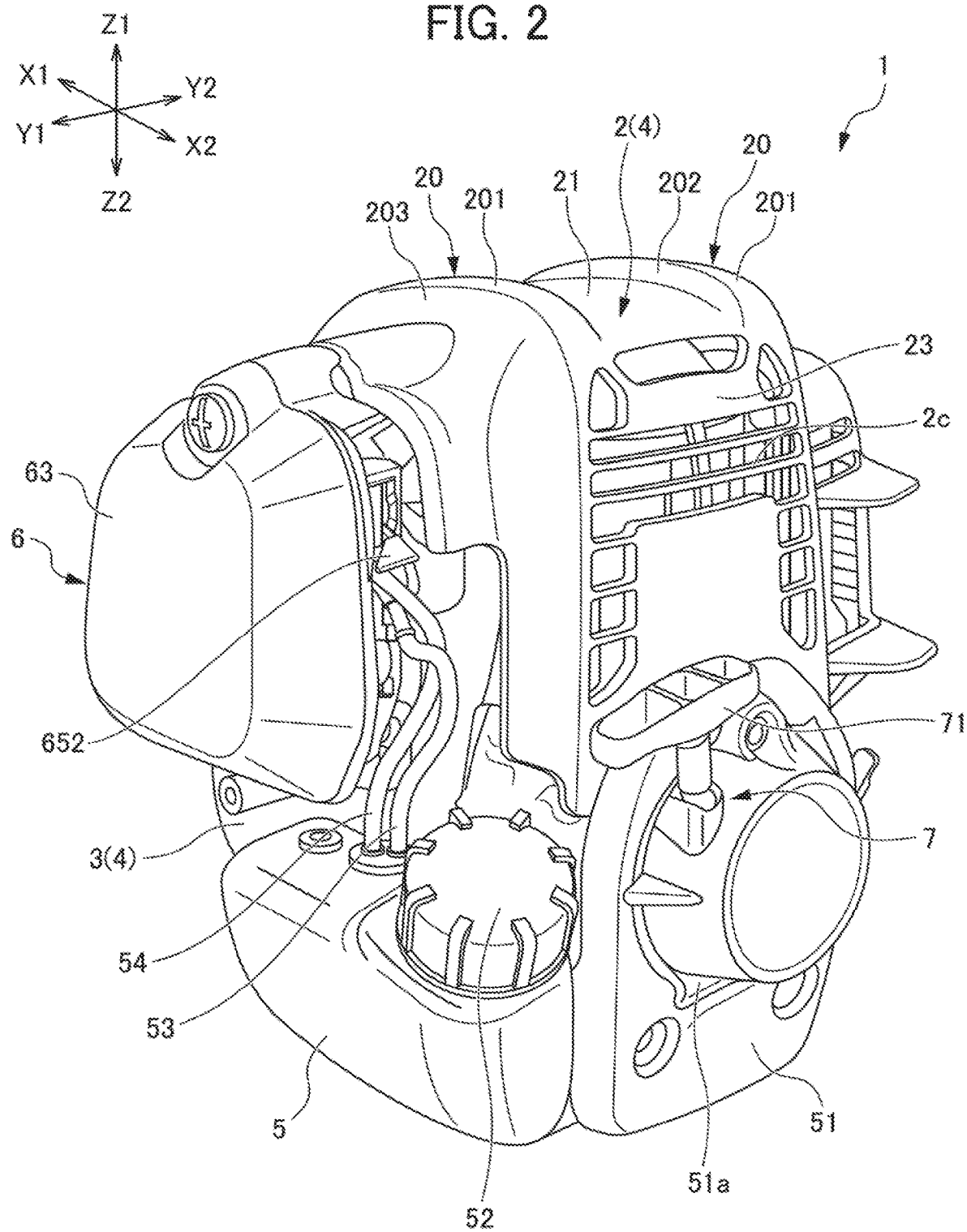
FIG. 2 is a back perspective view of a general-purpose engine having an intake member according to an embodiment of the present invention.
Figure 3:
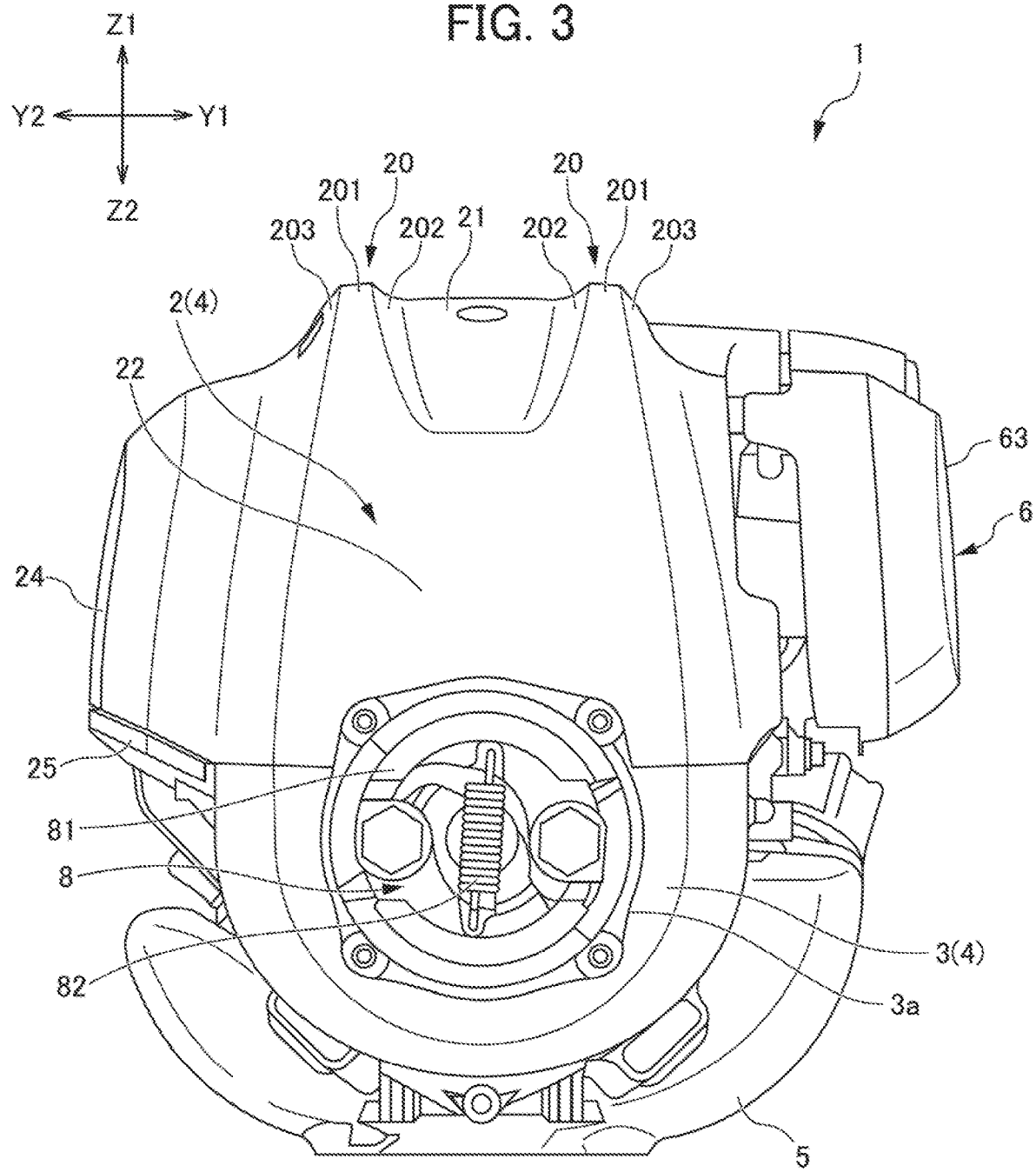
FIG. 3 is a front view of a general-purpose engine having an intake member according to an embodiment of the present invention.
Figure 4:
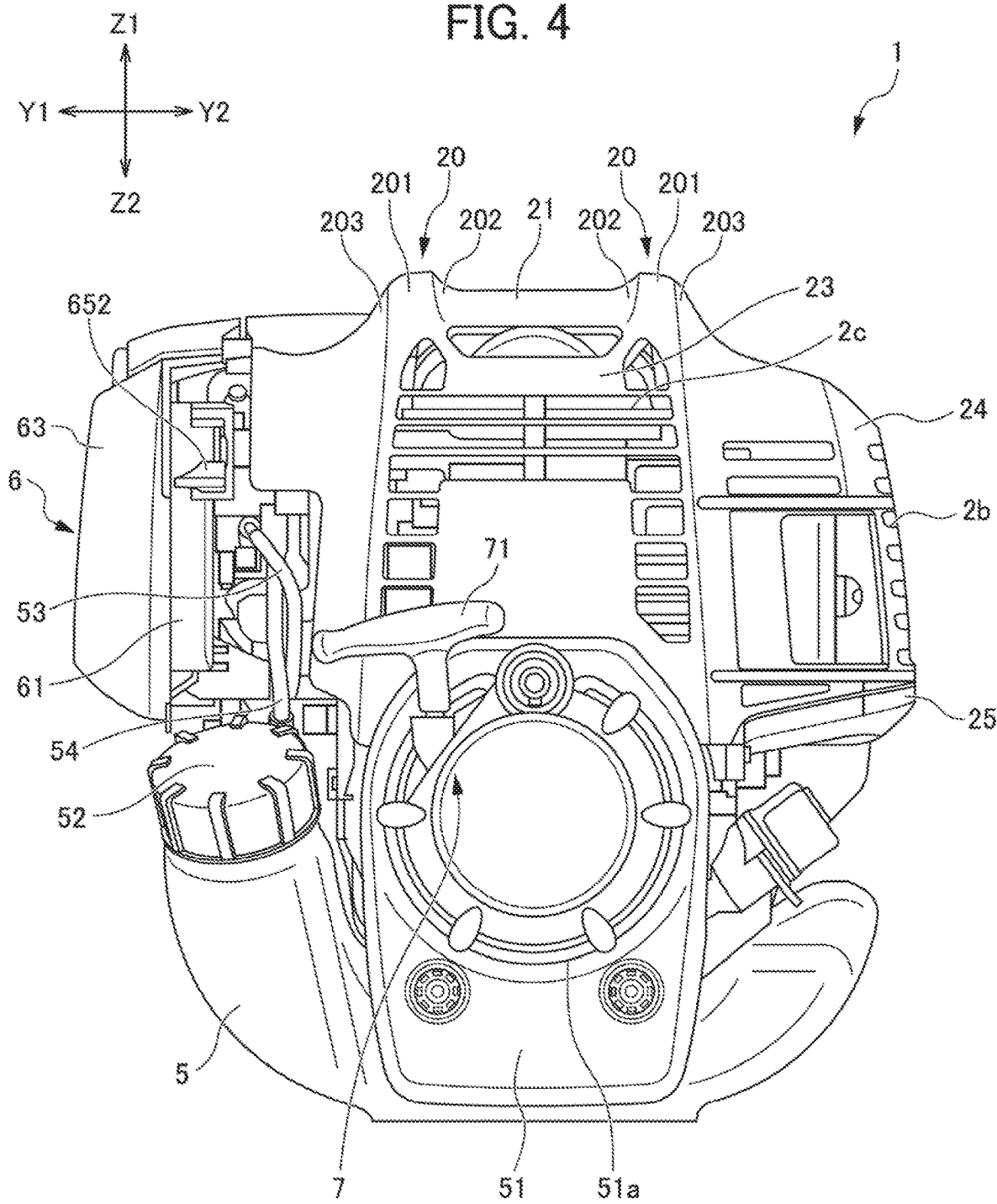
FIG. 4 is a back view of a general-purpose engine having an intake member according to an embodiment of the present invention.
Figure 5:
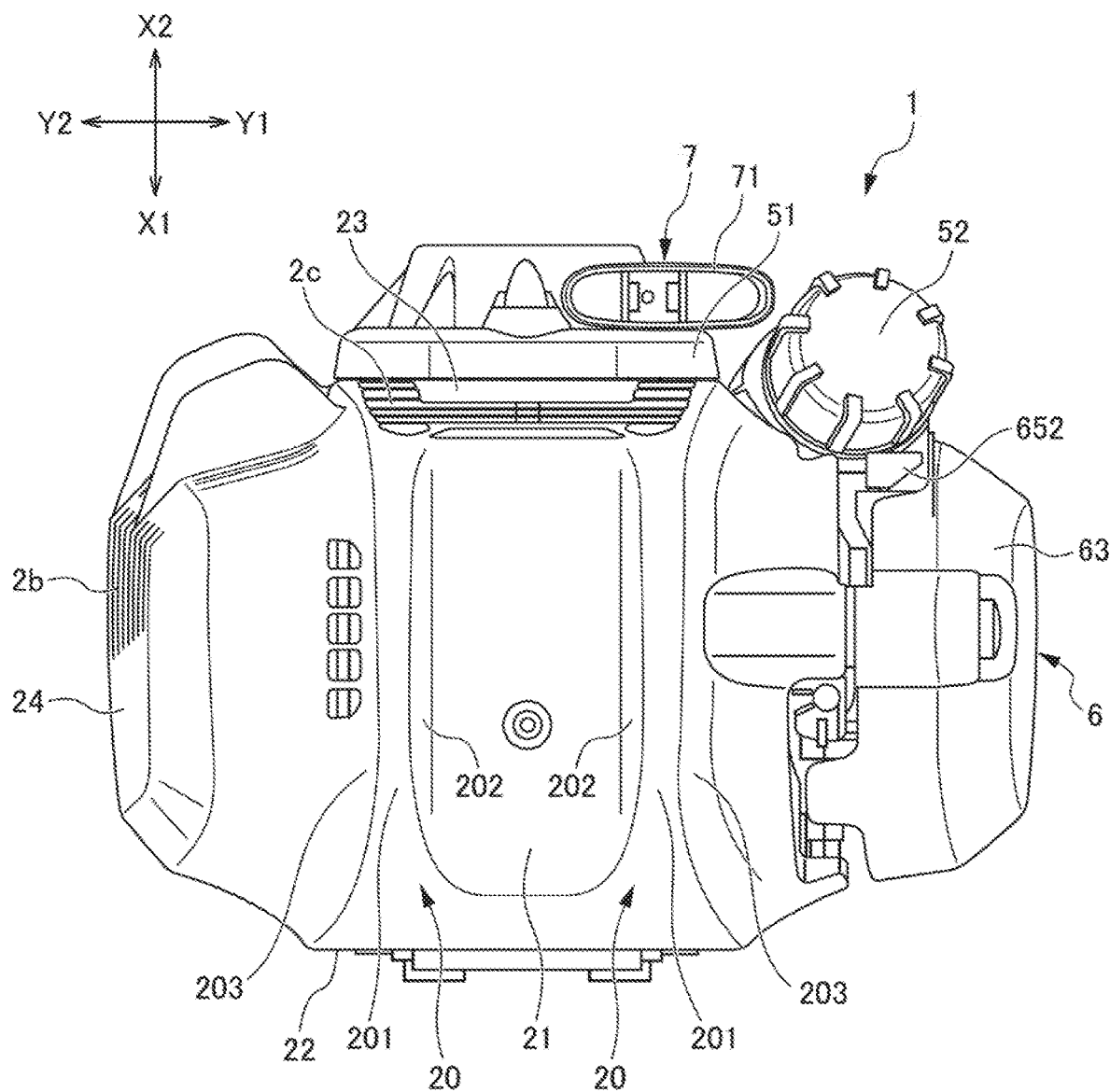
FIG. 5 is a plan view of a general-purpose engine having an intake member according to an embodiment of the present invention.
Figure 6:
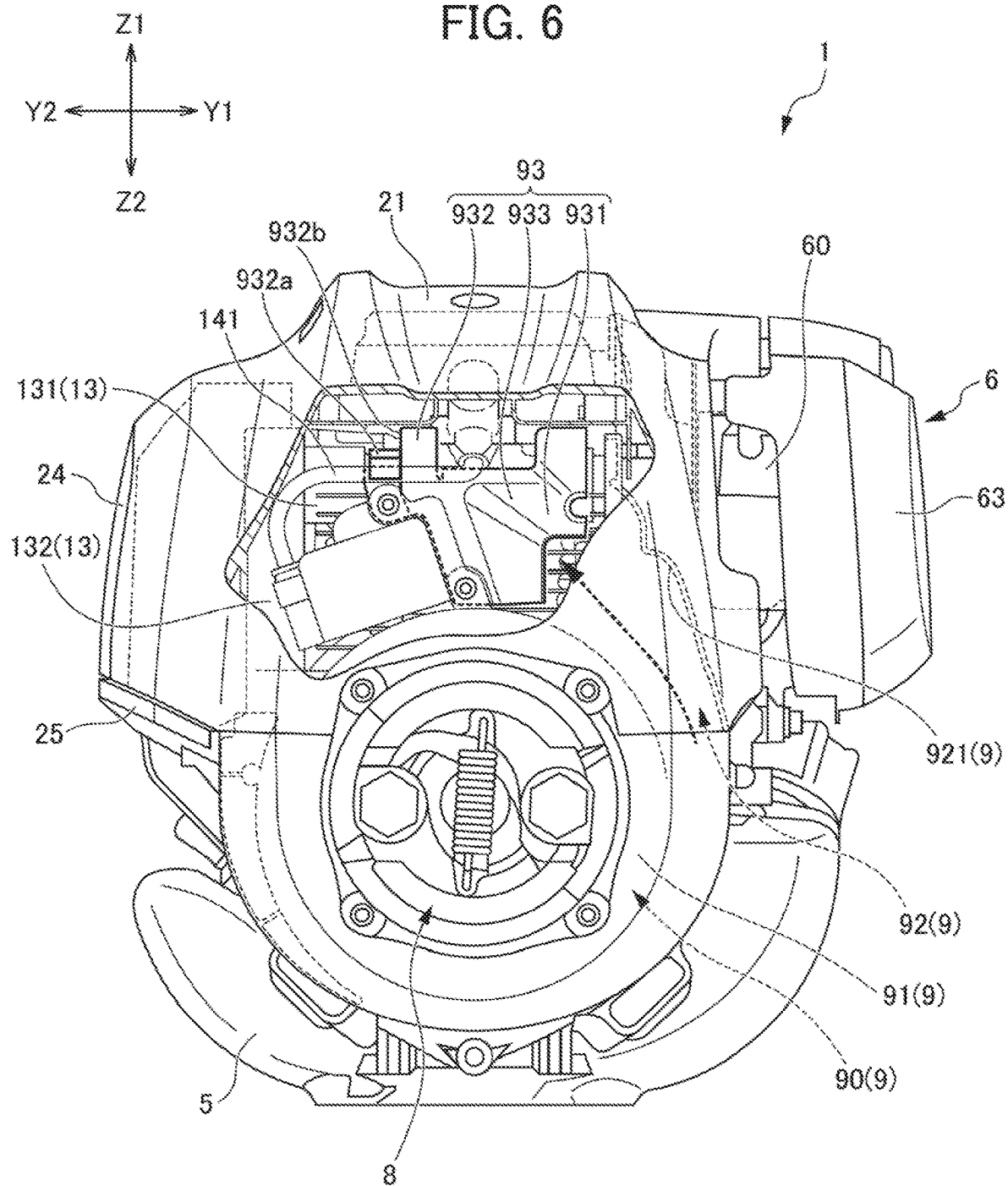
FIG. 6 is a first longitudinal cross-sectional view of a general-purpose engine having an intake member according to an embodiment of the present invention.
Figure 7:
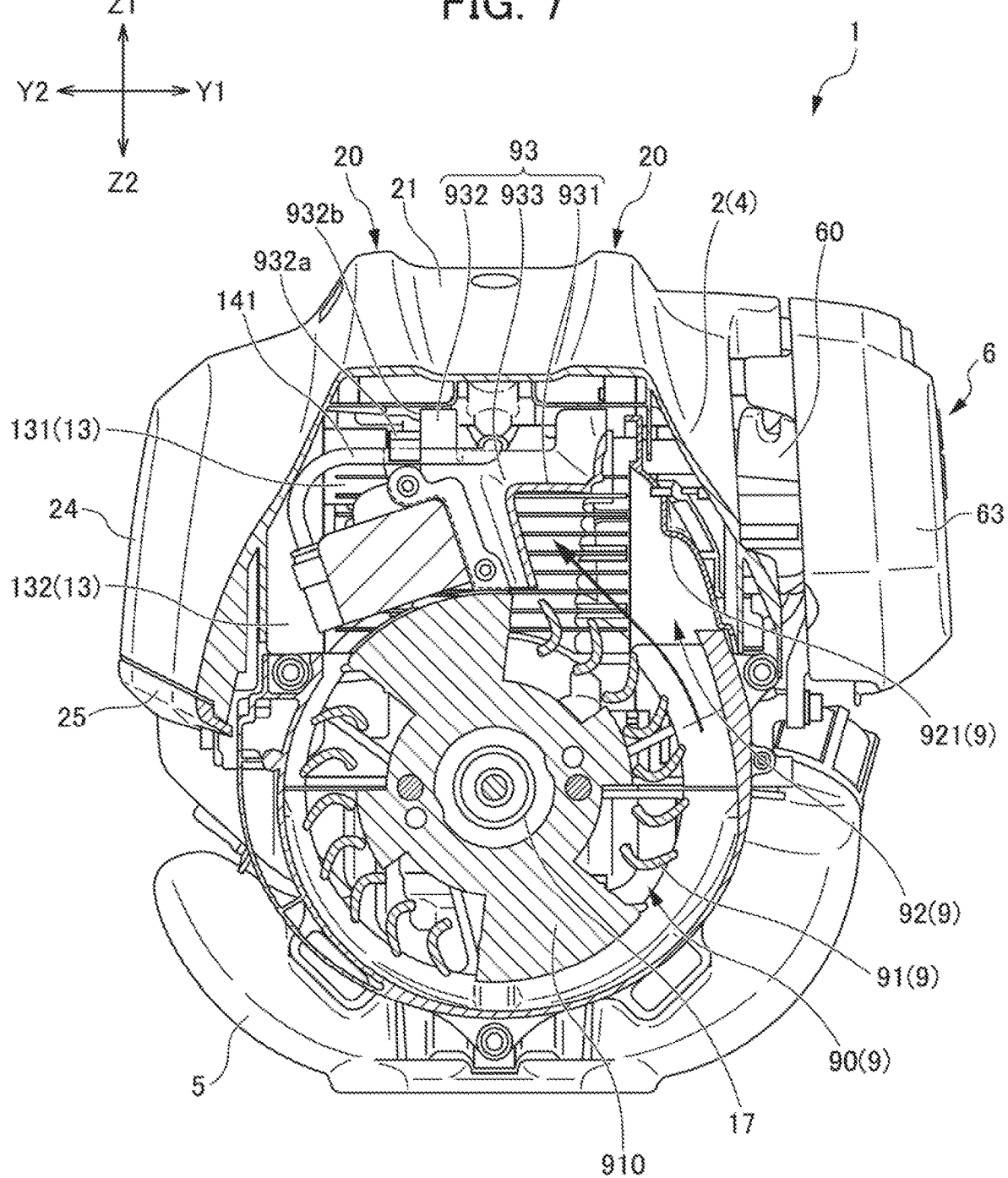
FIG. 7 is a second longitudinal cross-sectional view of a general-purpose engine having an intake member according to an embodiment of the present invention.
Figure 8:
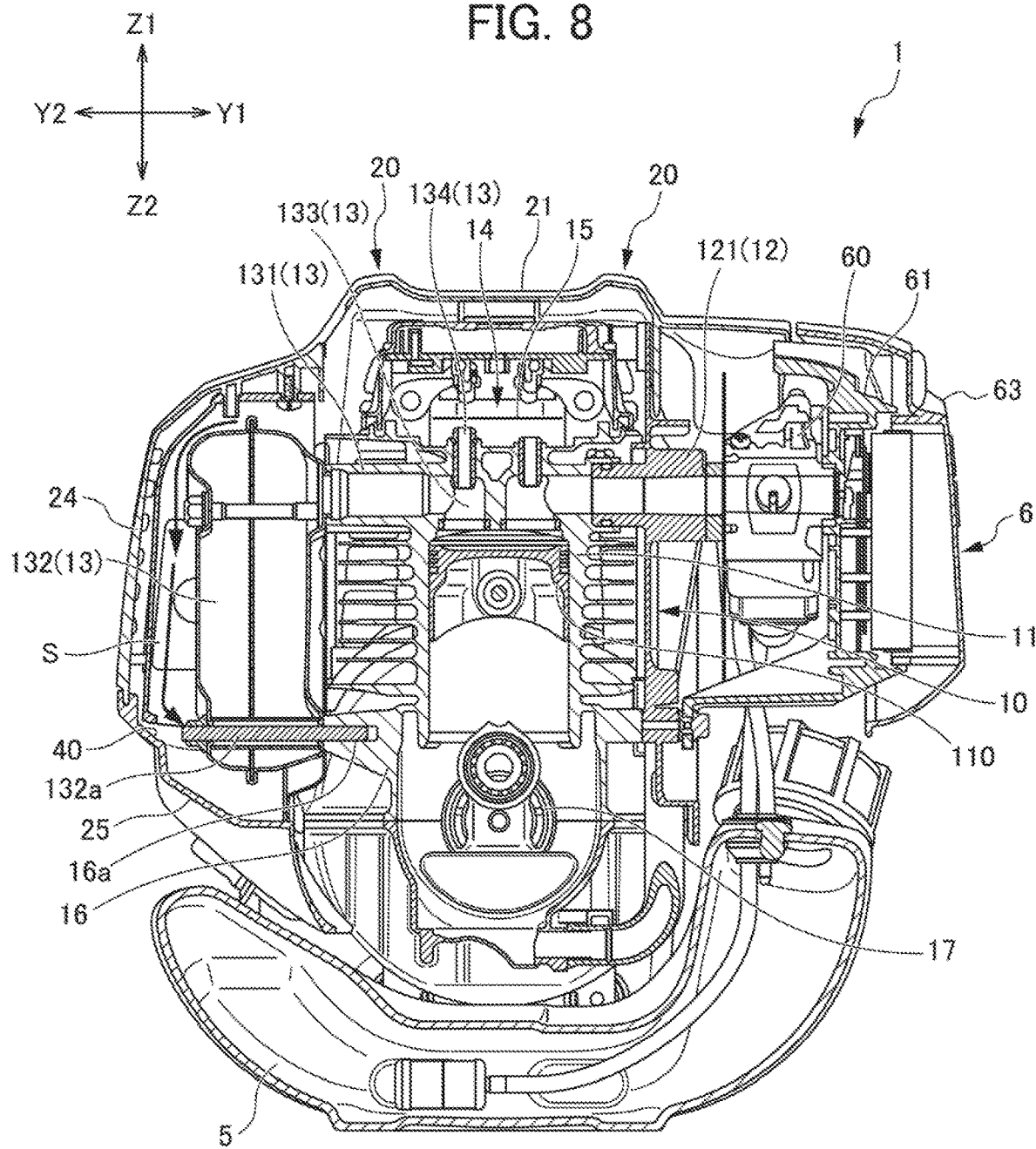
FIG. 8 is a third longitudinal cross-sectional view of a general-purpose engine having an intake member according to an embodiment of the present invention.
Figure 9:
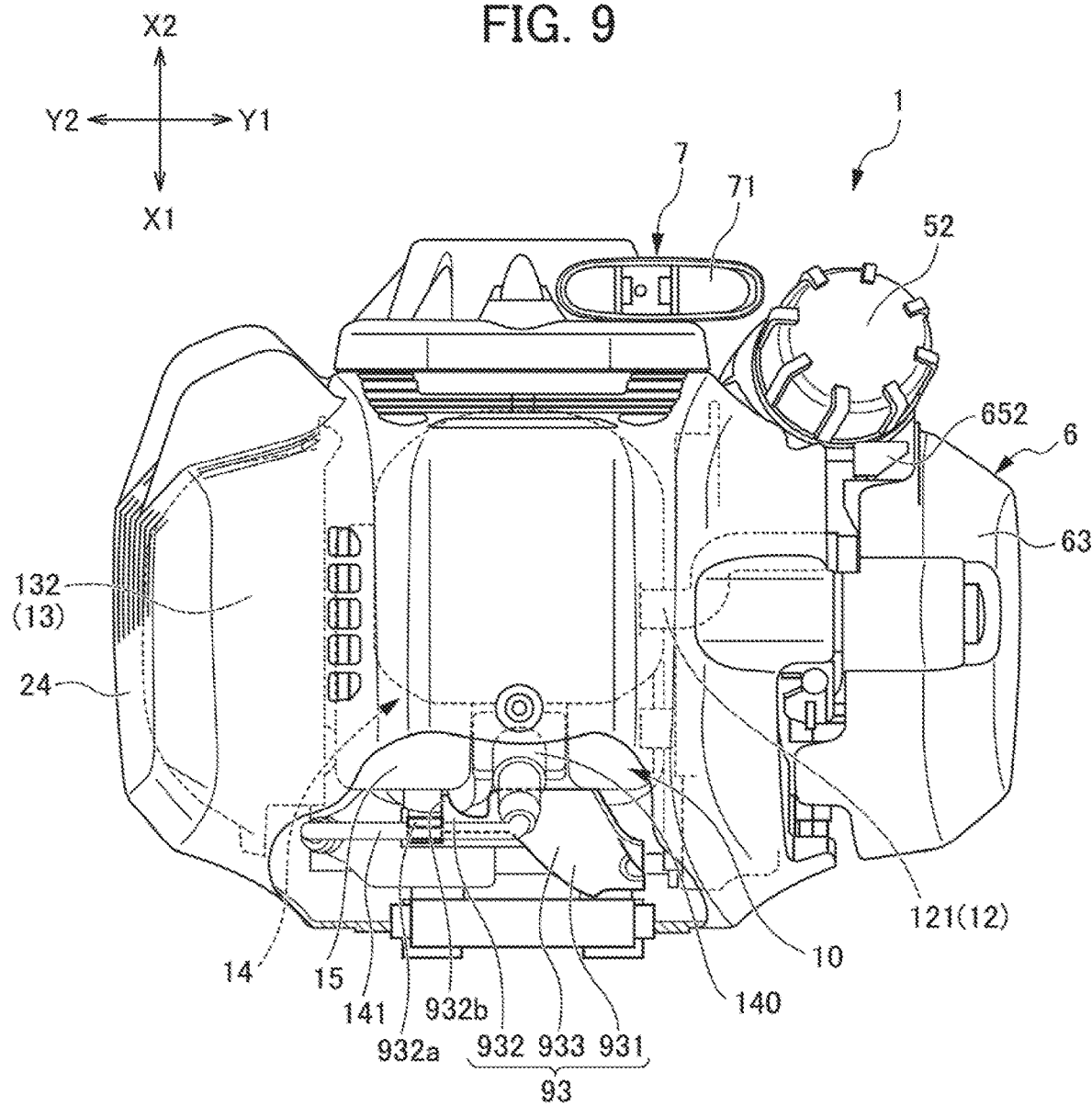
FIG. 9 is a first transverse sectional view of a general-purpose engine having an intake member according to an embodiment of the present invention.
Figure 10:
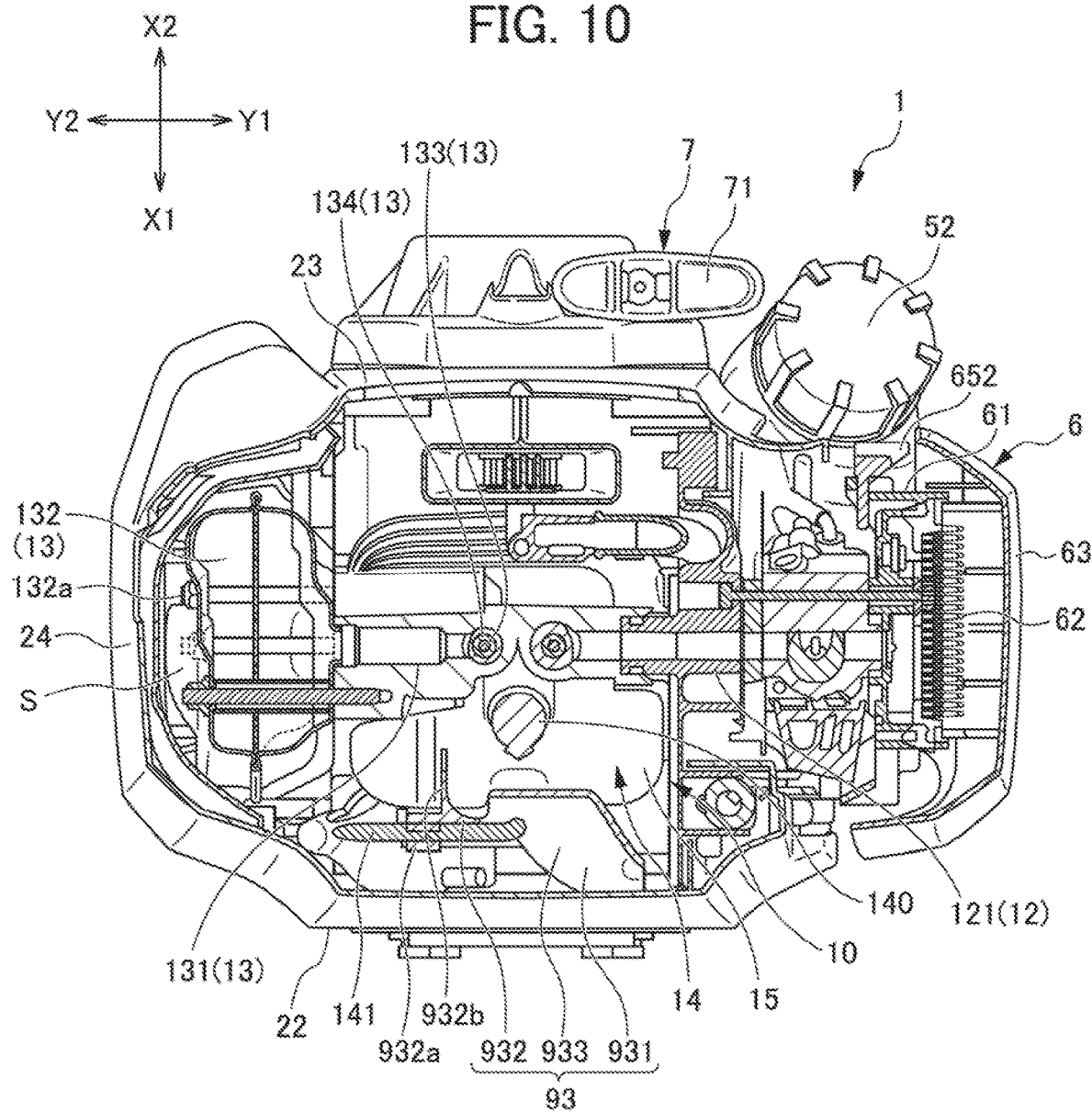
FIG. 10 is a second transverse sectional view of a general-purpose engine having an intake member according to an embodiment of the present invention.

FIG. 1 is a front perspective view of a general-purpose engine having an intake member according to an embodiment of the present invention. FIG. 2 is a back perspective view of a general-purpose engine having an intake member according to an embodiment of the present invention. FIG. 3 is a front view of a general-purpose engine having an intake member according to an embodiment of the present invention. FIG. 4 is a back view of a general-purpose engine having an intake member according to an embodiment of the present invention. FIG. 5 is a plan view of a general-purpose engine having an intake member according to an embodiment of the present invention. FIG. 6 is a first longitudinal cross-sectional view of a general-purpose engine having an intake member according to an embodiment of the present invention. FIG. 7 is a second longitudinal cross-sectional view of a general-purpose engine having an intake member according to an embodiment of the present invention. FIG. 8 is a third longitudinal cross-sectional view of a general-purpose engine having an intake member according to an embodiment of the present invention. FIG. 9 is a first transverse sectional view of a general-purpose engine having an intake member according to an embodiment of the present invention. FIG. 10 is a second transverse sectional view of a general-purpose engine having an intake member according to an embodiment of the present invention.

Here, the third longitudinal cross-sectional view of FIG. 8 is a longitudinal cross-sectional view that is closer to a front 22 side of a top cover 2 than the second longitudinal cross-sectional view of FIG. 7. The second longitudinal cross-sectional view of FIG. 7 is a longitudinal cross-sectional view that is closer to the front 22 side of the top cover 2 than the first longitudinal cross-sectional view of FIG. 6. In addition, the second transverse sectional view of FIG. 10 is a transverse sectional view that is below the first transverse sectional view of FIG. 9. FIG. 6 is a partial longitudinal cross-sectional view. FIG. 9 is a partial transverse sectional view.

It should be noted that the arrows shown in each of the drawings indicate the directions in the general-purpose engine 1. The arrow X1-X2 indicates the longitudinal direction of the general-purpose engine 1. The direction X1 is forward and the direction X2 is backward. The arrow Y1-Y2 indicates the lateral direction of the general-purpose engine 1. The lateral direction of the general-purpose engine 1 indicates the lateral direction in a state in which the general-purpose engine 1 is viewed from the front, that is, in a state in which the general-purpose engine 1 is viewed in the direction X2. Thus, the direction Y1 is to the right and the direction Y2 is to the left. The arrow direction Z1-Z2 indicates the height direction (the direction along the direction of gravity) of the general-purpose engine 1. The direction Z1 is up and the direction Z2 is down. In addition, a general-purpose engine indicates a multi-purpose engine whose application is not specified, for example, for automobiles or two-wheeled vehicles.

In the present embodiment, the general-purpose engine 1 is used as a drive source of a small working machine such as a weed trimmer, for example. The general-purpose engine 1 appears small at first glance; however, it is a four-stroke engine with higher horsepower than conventional. It is possible to operate the general-purpose engine 1 even if it is sloped by 360 degrees. The general-purpose engine 1 is suitable as a drive source for a hand-held work machine such as a weed trimmer. When used in a weed trimmer, the general-purpose engine 1 is mounted to the base end of a drive shaft to which a blade is attached at the tip.

The general-purpose engine 1 includes an engine body 10, a shroud 4 including a top cover 2, a bottom cover 3 and an inner cover 25, a fuel tank 5, an air cleaner 6, a recoil starter 7, a tank guard 51, a fuel filler cap 52, a fuel tube 53, a fuel return tube 54, a centrifugal clutch 8 and a cooling mechanism 9.

The engine body 10 has a cylinder block 14 and a crankcase 16 coupled to the cylinder block 14. A cylinder 11 and a cylinder head 15 are integrally formed in the cylinder block 14. The cylinder 11 houses a piston 110 to be slidable, and the piston 110 is coupled to a crankshaft 17.

A spark plug 140, an intake system component 12 having an intake port 121, and exhaust system components 13 including an exhaust port 131, a canister muffler 132, an exhaust valve 133, an exhaust valve guide 134 supporting the exhaust valve 133, and the like are connected to the cylinder 11. The crankcase 16 supports the crankshaft 17.

The top cover 2 is disposed on the top of the general-purpose engine 1, and covers the top of the engine body 10 (such as the cylinder block 14 and crankcase 16). The top cover 2 is a substantially dome-shaped cover having an open bottom surface, and is formed so as to cover the cylinder block 14 and the like in which the cylinder 11 and the cylinder head 15 are integrally formed. Furthermore, the exhaust port 131 and the canister muffler 132 are accommodated and disposed on one of the both sides of the general-purpose engine 1 (left side in the figure), and the top cover 2 is formed so as to cover them. It should be noted that the cannister muffler 132 is arranged between the fuel tank 5 described later and the engine main body 10, and reduces the sound (exhaust sound) generated upon exhaust being emitted to outside and sound (intake sound) generated upon air being drawn into the intake plumbing, as well as preventing transpiration by reducing the pressure and temporarily capturing thermally expanded vaporized fuel.

A plurality of vents is formed in the top cover 2. More specifically, a top vent 2a, a side vent 2b, and a back vent 2c are formed. The top vent 2a, the side vent 2b, and the back vent 2c are used for the discharge of heat generated from the engine body 10 in particular, the cylinder 11 and the exhaust system component 13. Furthermore, the cooling air from the cooling fan 90 to be described later is used for cooling of the engine body 10 or the like, following which the resulting air is discharged from the plurality of vents.

On the left side of the general-purpose engine 1 in which the exhaust system is disposed, the top vent 2a is formed at the outer surface portion 203 configuring the outer surface of the bridge portion 20 to be described later. The top vent 2a is configured by a plurality of notches extending obliquely upward from the outside toward the inside. The side vent 2b is formed on the left side surface 24 of the general-purpose engine 1 in which the exhaust system is disposed. The side vent 2b is configured by a plurality of notches extending in the front-back direction on the back side of the left side surface 24. The back vent 2c is formed over a wide area of the back 23 of the top cover 2. The back vent 2c is configured by a plurality of notches of different lengths extending in the lateral direction.

Furthermore, at the upper surface 21 of the top cover 2, a pair of bridge portions 20 and 20 is formed so as to be opposingly disposed. The pair of bridge portions 20 and 20 has a shape symmetrical to each other with respect to the central portion of the upper surface 21 of the top cover 2. The pair of bridge portions 20 and 20 is formed so as to protrude from the upper surface 21 of the top cover 2 thereby configuring the top of the top cover 2. Furthermore, the pair of bridge portions 20 and 20 extends continuously from the front 22 of the top cover 2 to the back 23 through the upper surface 21. That is, the front 22 and the back 23 of the top cover 2 is bridged by the pair of bridge portions 20 and 20.

The pair of bridge portions 20 and 20 includes a surface portion 201 configuring the surface thereof, an inner surface portion 202 configuring the inner surface connecting the surface portion 201 with the upper surface 21 of the general-purpose engine 1, and an outer surface portion 203 configuring the outer surface. As shown in FIG. 5, the pair of bridge portions 20 and 20 is arranged to face each other substantially in parallel in a plan view of the general-purpose engine 1.

The surface portion 201 configuring the surface of each bridge portion 20 is continuous without a step with the front 22 of the top cover 2, and is also continuous without a step with the back 23 of the top cover 2. The surface portion 201 has a tapered shape having a narrower width as going upward in a front view of the general-purpose engine 1. Similarly, the surface portion 201 has a tapered shape having a narrower width as going upward even in a back view of the back of the general-purpose engine 1. Therefore, as shown in FIG. 5, in a plan view of the general-purpose engine 1, the pair of bridge portions 20 and 20 has an increased width dimension toward the front 22 side, and similarly, the pair of bridge portions 20 and 20 has an increased width dimension toward the back 23 side. Thus, even in a case of increasing in size due to raising the output of the general-purpose engine 1, and the width becoming larger, since the line of sight is guided in the vertical direction by the pair of bridge portions 20 and 20, a sharp and slim impression is given as a whole, so that it appears small.

Furthermore, the surface portion 201 configuring the surface of each bridge portion 20 is sloped downward toward the outside in a front view of the general-purpose engine 1. That is, the surface portions 201 and 201 of the pair of bridge portions 20 and 20 are positioned upward as moving inward, and are positioned downward as moving outward. Thus, in a case in which the general-purpose engine 1 is placed upside down, since both inner portions of the surface portion 201, 201 of the pair of bridge portions 20 and 20 are preferentially in contact with the installation surface, the pair of bridge portions 20 and 20 serves as a support portion, and a stable posture is ensured. At the same time, the upper surface 21 of the general-purpose engine 1 is not in direct contact with the installation surface, and thus, the installation area is reduced, and scratches on the upper surface 21 are suppressed. Therefore, it is possible to protect a label affixed to the upper surface 21.

The inner surface portion 202 configures an inner surface connecting the surface of each bridge portion 20 with the upper surface 21 of the top cover 2. The inner surface portion 202 is sloped outward from the upper surface 21 of the general-purpose engine 1 toward the surface of the bridge portion 20, in a front view of the general-purpose engine 1. That is, the inner surface portions 202 and 202 of the pair of bridge portions 20 and 20 are formed so as to be spaced from each other toward the surface of each bridge portion 20 from the upper surface 21 of the top cover 2. Thus, in a case in which the general-purpose engine 1 is placed upside down, the force in the outer direction acts on the pair of bridge portions 20 and 20 that serves as a support portion, a result of which a more stable posture is ensured.

The outer surface portion 203 configures an outer surface connecting the surface of each bridge portion 20 with the upper surface 21 of the top cover 2. The outer surface portion 203 is sloped downward toward the outer side. With such a configuration, a sharper and slimmer appearance shape can be obtained.

The bottom cover 3 is disposed at the lower portion of the general-purpose engine 1 and covers the lower portion of the engine body 10. The bottom cover 3 is a substantially semicircular cover in a front view of the general-purpose engine 1. The bottom cover 3 is formed so as to cover the cooling fins 91 provided on the flywheel 910 which is coupled to the crankshaft 17 for rotation, the crankcase 16 which is coupled to the cylinder block 14. It should be noted that the flywheel 910 allows smooth low-speed rotation of the general-purpose engine 1 having a small number of cylinders using the inertia during rotation. In the present embodiment, a plurality of cooling fins 91 is formed on the peripheral edge portion of the flywheel 910, thereby configuring the cooling fan 90.

A coupling hole 30 to which the drive shaft of the weed trimmer (not shown) is coupled is formed on the front side of the bottom cover 3. A centrifugal clutch 8 which engages or disengages the drive shaft only by an increase or decrease in the rotational speed of the crankshaft 17 is disposed within the coupling hole 30. The drive shaft is connected to the crankshaft 17 through the centrifugal clutch 8. It should be noted that, in the centrifugal clutch 8, torque is transmitted by the clutch shoe 81 rotating with the crankshaft 17 being pressed against the clutch drum on the drive shaft by the centrifugal force, while the torque transmission is interrupted by the restoring force of the spring 82 causing the clutch shoe 81 to move away from the clutch drum when the rotational speed of the crankshaft 17 decreases and the centrifugal force decreases.

As described above, the shroud 4 includes the top cover 2, the bottom cover 3, and the inner cover 25. The shroud 4 is formed so as to cover the engine body 10. The engine body 10 includes the cylinder block 14 in which the cylinder 11 and the cylinder head 15 are integrally formed, and the crankcase 16 which is coupled to the cylinder block 14. The shroud 4 is made of a resin member and is fixed to the engine body 10 by a bolt. The shape of the shroud 4, in particular the shape of the top cover 2 and the bottom cover 3, mainly configures the appearance shape of the general-purpose engine 1.

The fuel tank 5 is disposed at the lower portion of the general-purpose engine 1. The fuel tank 5 configures the entire lower portion of the general-purpose engine 1. The fuel tank 5 extends in a substantially circular-arc shape in a front view of the general-purpose engine 1. To the fuel tank 5, a fuel filler cap 52 for closing a fuel filler port, a fuel tube 53 for supplying fuel to the engine body, and a fuel return tube 54 for circulating the fuel to the fuel tank 5 are disposed on the side of the intake side (the right side of the general-purpose engine 1 in the figure) on which the air cleaner 6 is disposed, among both sides of the general-purpose engine 1.

A tank guard 51, which is a plate-shaped protective member that covers the back side of the fuel tank 5, and extends in the vertical direction in the central portion in the lateral direction of the general-purpose engine 1, is disposed on the back side of the fuel tank 5. A mounting hole 51a for mounting the recoil starter 7 is formed in the tank guard 51. It should be noted that, in addition to the grip 71, the recoil starter 7 includes a pulley (not shown), a rope wound around the pulley and connected to the grip 71, and the like. The recoil starter 7 applies a rotational force to the crankshaft 17 by the operation of the grip 71 by the user to start the general-purpose engine 1.

The air cleaner 6 is disposed on the side of the intake side (the right side of the general-purpose engine 1 in the figure) among the both sides of the general-purpose engine 1. The air cleaner 6 is coupled to the upstream side along the inflow direction of the intake air to the carburetor 60, and purifies the intake air to the carburetor 60. The air cleaner 6 will be described in detail later.

The cooling mechanism 9 supplies cooling air for cooling the engine body 10. The cooling mechanism 9 includes a cooling fan 90, an air blowing portion 92, and an air guide 93.

The cooling fan 90 is configured by forming a plurality of cooling fins 91 on the peripheral edge portion of the flywheel 910 as described above. The cooling fan 90 is rotated by the flywheel coaxially disposed with the crankshaft 17 being integrally rotated by the rotation of the crankshaft 17, thereby generating cooling air.

The blowing portion 92 blows the cooling air generated by the rotation of the cooling fan 90 into the general-purpose engine 1. The blowing portion 92 is disposed on the side of the intake side (the right side in the figure) of the cooling fan 90. The blowing portion 92 is a passage through which the cooling air flows. A convex portion 921 for directing the cooling air toward the air guide 93 by protruding inwardly is formed inside the blowing portion 92. More specifically, the convex portion 921 is formed so as to project inward at the outer peripheral portion of the passage outlet configuring the blowing portion 92. Owing to the convex portion 921, the cooling air blown out from the blowing portion 92 is more reliably guided toward the cylinder 11 and the exhaust system component 13, and thus, it is possible to cool the cylinder 11 and the exhaust system component 13 more efficiently.

The air guide 93 guides the cooling air blown out from the blowing portion 92 toward the cylinder 11 and the exhaust system components 13 (the exhaust port 131, the canister muffler 132, the exhaust valve 133, the exhaust valve guide 134, and the like; the same shall apply hereinafter). The air guide 93 is disposed above the cooling fan 90. Furthermore, the air guide 93 includes an air guide body 931 having a substantially L-shaped cross section, and a fixing portion 932 for fixing the air guide body 931 to the engine body 10 side. The air guide body 931 extends toward the blowing portion 92 in a state in which the bent portion 933 faces the exhaust system component 13 side.

The air guide 93 allows the cooling air generated by the rotation of the cooling fan 90 to be efficiently guided toward the cylinder 11 and the exhaust system component 13 from the blowing portion 92. Therefore, it is possible to efficiently cool the cylinder 11 and the exhaust system component 13 which are heated high easily with high output of the general-purpose engine 1.

More specifically, the air guide body 931 extends to be sloped toward the engine body 10 side from the front 22 side of the general-purpose engine 1 as going toward the exhaust system component 13 side from the blowing portion 92 side. Thus, the cooling air blown out from the blowing portion 92 is configured to be more reliably guided to the engine body 10 and the exhaust system component 13.

Furthermore, the fixing portion 932 has a fitting portion 932*a* and an engaging portion 932*b*. The fitting portion 932*a* is fitted by inserting a high tension cord connected to the ignition plug 140 thereinto. The engaging portion 932*b* protrudes toward the cylinder block 14 side, and is engaged with the gap of the cylinder block 14. By the fitting portion 932*a* and the engaging portion 932*b*, the air guide body 931 is fixed to the engine body 10.

Next, cooling of a stud bolt 132*a*, which is a fixture of the canister muffler 132 of the general-purpose engine 1 according to the present embodiment, will be described in detail with reference to FIG. 8 and the like.

As shown in FIG. 8, a space S is formed between the shroud 4 and the canister muffler 132. The cooling air blown from the blowing portion 92 toward the upper portion of the engine body 10 can flow downward from above through the space S. The space S is formed by the left side surface 24 of the exhaust system component 13 side of the top cover 2, which configures the shroud 4, expanding outward. The space S is formed from the upper portion to the lower portion of the canister muffler 132, and a clearance between the space S and the canister muffler 132 is provided to become larger downward. Owing to the space S, the cooling air flows from the top of the engine body 10 (such as the cylinder block 14) to the periphery of the canister muffler 132, thereby cooling the canister muffler 132.

Furthermore, a return portion 40 for guiding the cooling air toward a stud bolt 132*a* for fixing the canister muffler 132 to the engine body 10 is formed on an inner wall surface of the shroud 4 (the left side surface 24 of the top cover 2 on the of the exhaust system component 13 side) forming the space S. The return portion 40 is formed in the inner cover 25 which is disposed between the top cover 2 and the bottom cover 3 configuring the shroud 4. More specifically, the inner wall surface of the inner cover 25 protrudes inward toward the stud bolt 132*a* disposed at the lower portion of the canister muffler 132, thereby forming the return portion 40. In a longitudinal cross-sectional view shown in FIG. 8, the return portion 40 has a sloped surface sloped downward toward the inside. The cooling air flowing in from above is guided toward the stud bolt 132*a* by the sloped surface.

It should be noted that the cooling air is guided toward the stud bolt 132*a* by the return portion 40, and the stud bolt 132*a* is disposed below the canister muffler 132. The fixture of the canister muffler 132 is disposed not only on the stud bolt 132*a* disposed at the lower portion but also on the upper portion and the middle portion of the canister muffler 132 (refer to FIGS. 8 and 10). However, it is effective to induce the cooling air to the stud bolt 132*a* disposed at the lower portion of the canister muffler 132 which is easily heated and in which heat is most prone to be caged. As shown in FIG. 8, the tip of the stud bolt 132*a* is inserted into and fixed to a boss 16*a* which is a mounting portion of the crankcase 16 configuring the engine body 10.

Figure 11:
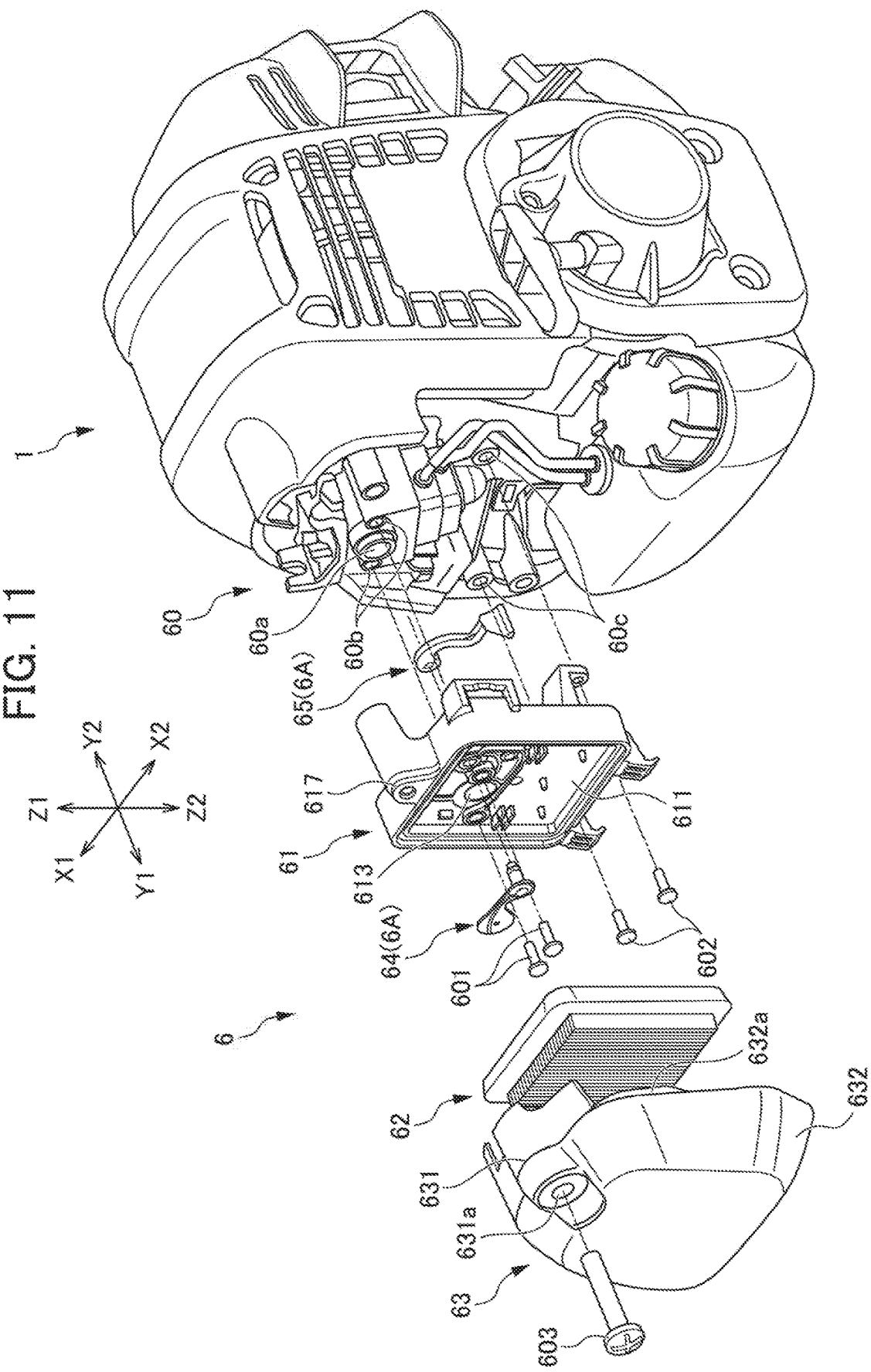
FIG. 11 is an exploded perspective view of a portion of a general-purpose engine having an intake member according to an embodiment of the present invention.
Figure 12:
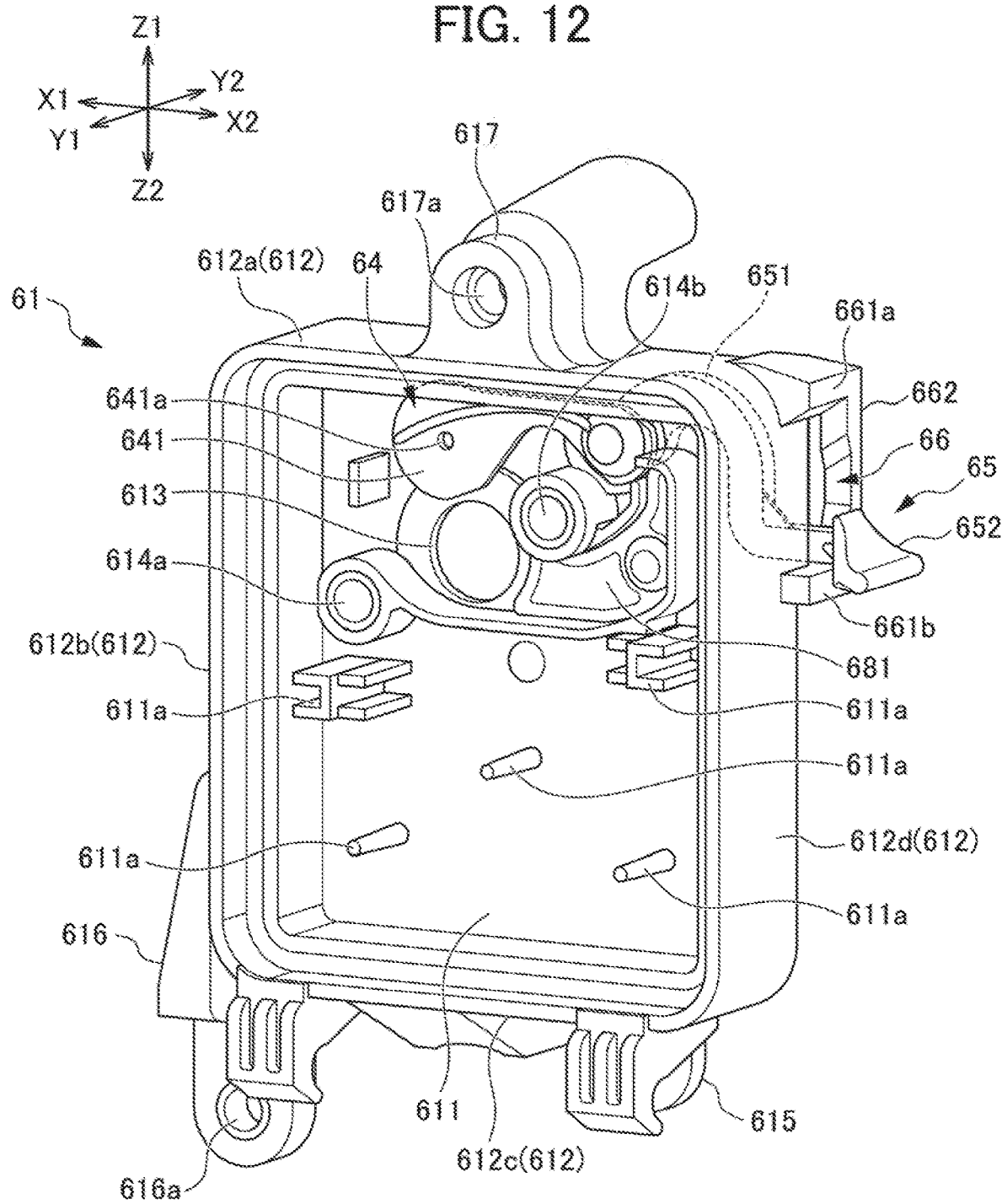
FIG. 12 is a perspective view of an intake member according to an embodiment of the present invention as viewed from the outside.
Figure 13:
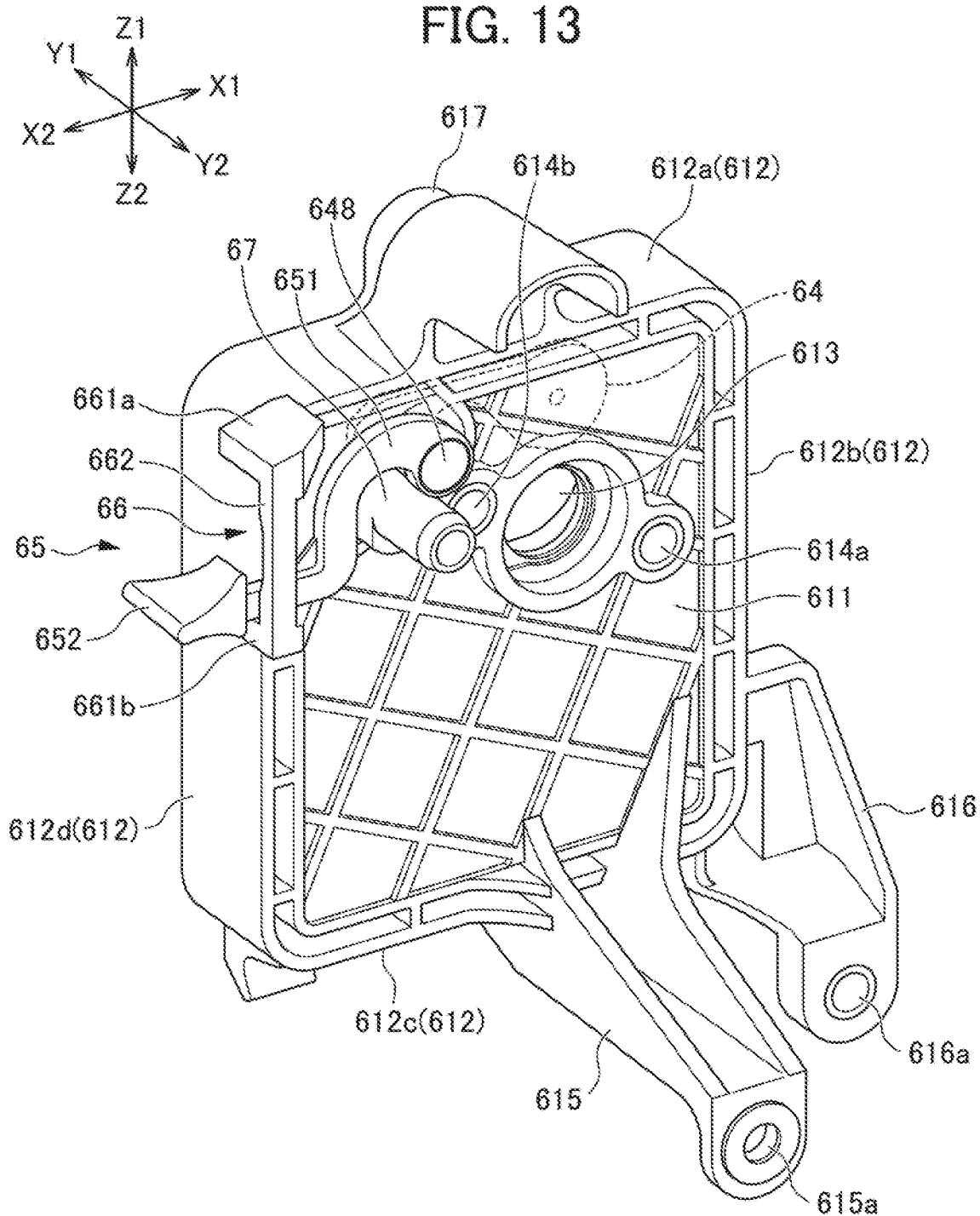
FIG. 13 is a perspective view of an intake member according to an embodiment of the present invention as viewed from the inside.
Figure 14:
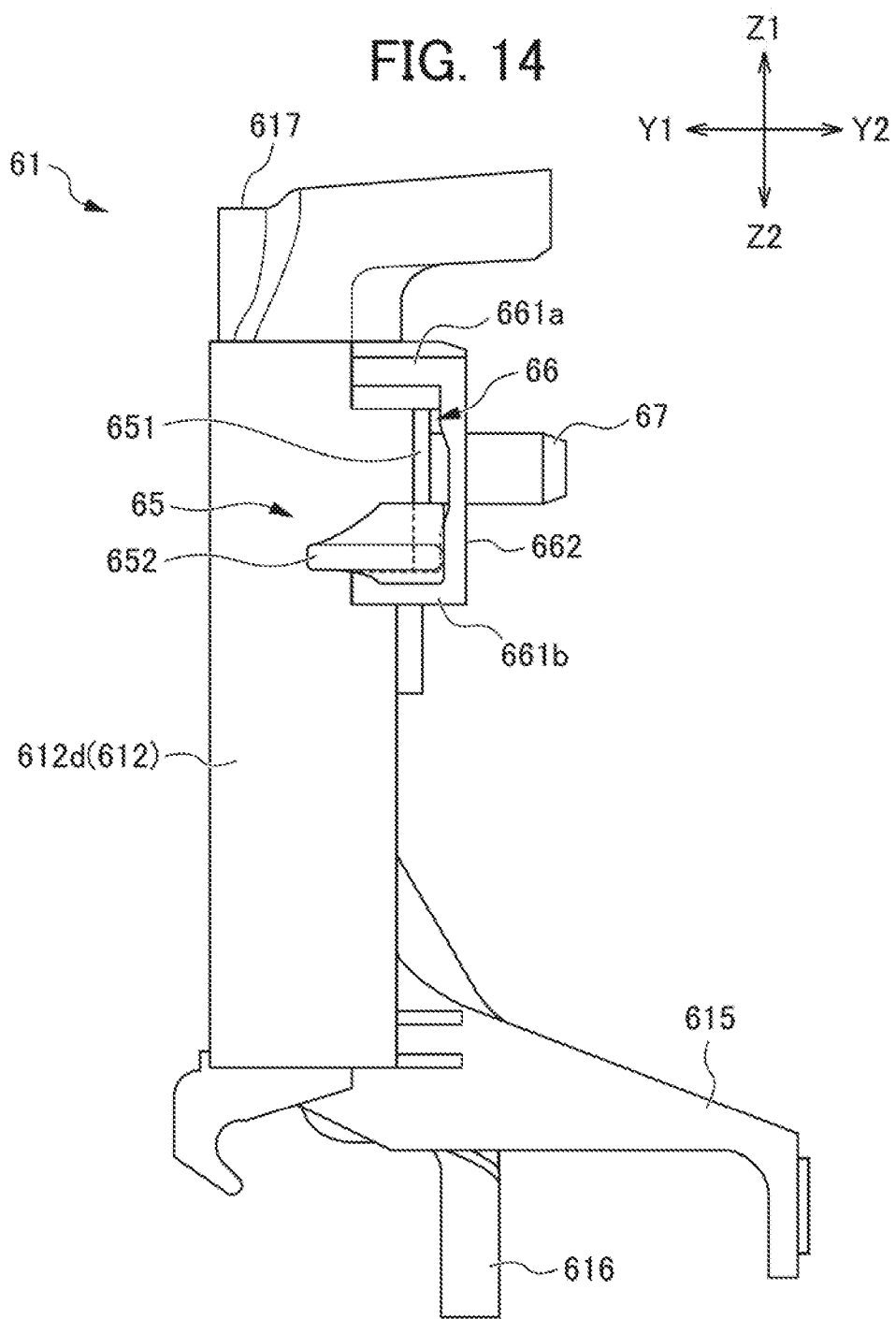
FIG. 14 is a back view of an intake member according to an embodiment of the present invention.
Figure 15:
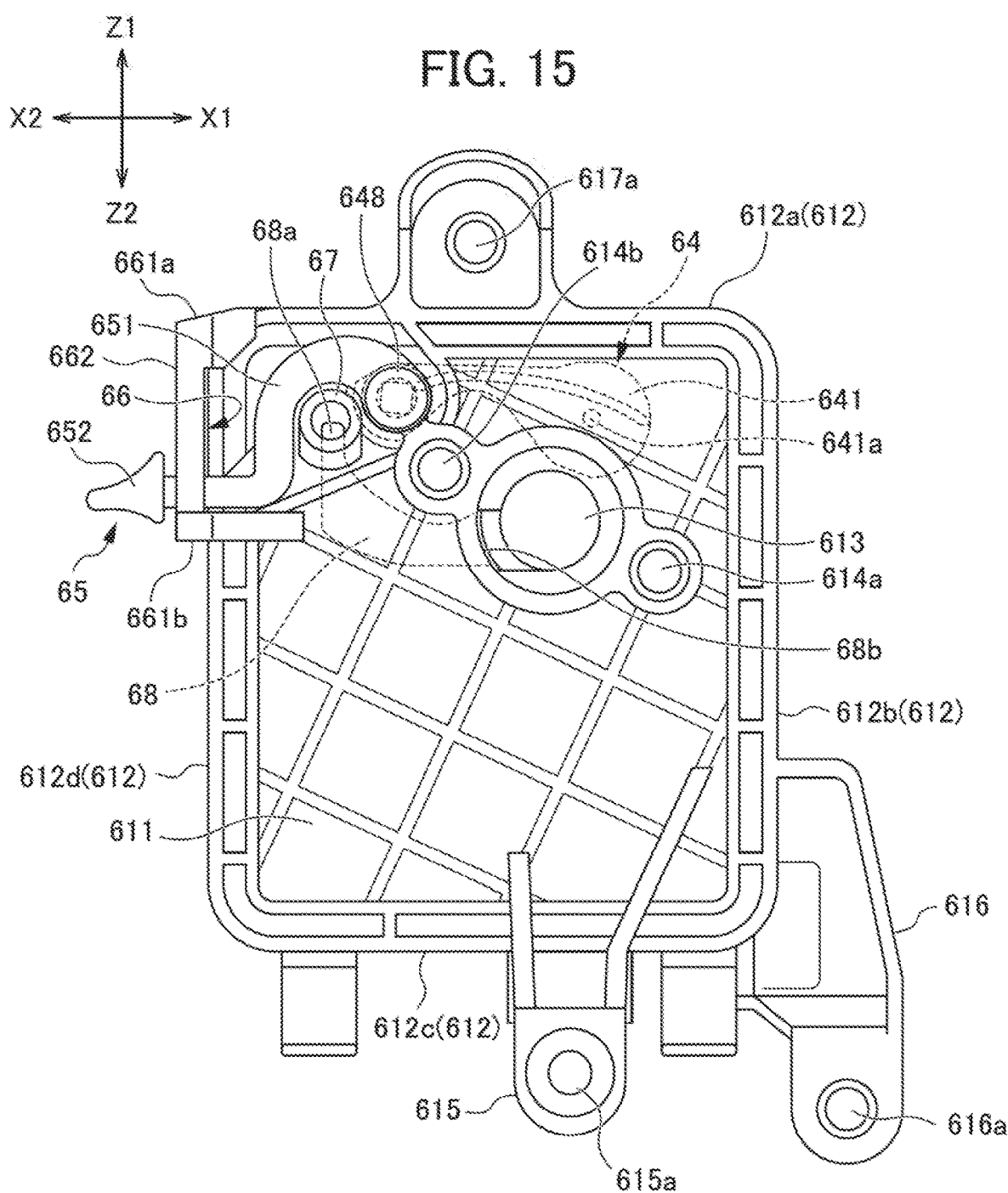
FIG. 15 is a side view of an intake member according to an embodiment of the present invention as viewed from the inside.

Next, the air cleaner 6 provided in the general-purpose engine 1 according to the present embodiment will be described. FIG. 11 is an exploded perspective view of a portion of a general-purpose engine having an intake member according to an embodiment of the present invention. FIG. 12 is a perspective view of an intake member according to an embodiment of the present invention as viewed from the outside. FIG. 13 is a perspective view of an intake member according to an embodiment of the present invention as viewed from the inside. FIG. 14 is a back view of an intake member according to an embodiment of the present invention. FIG. 15 is a side view of an intake member according to an embodiment of the present invention as viewed from the inside. The air cleaner 6 provided in the general-purpose engine 1 according to the present embodiment is disposed on the outside of the carburetor 60, more specifically, on the side opposite to the engine body 10 (direction Y1 side) with the carburetor 60 interposed therebetween. As shown in FIG. 11, the air cleaner 6 includes an air cleaner case 61, an air filter 62, a cover 63, a choke valve 64, and a choke lever 65. By providing the choke valve 64 and the choke lever 65 to the air cleaner case 61, the choke valve 64 and the choke lever 65 configure an opening/closing mechanism 6A for opening and closing the opening 613 of the air cleaner case 61.

The air cleaner case 61 illustrated in the present embodiment is an embodiment of an intake member. The air cleaner case 61 is a box-shaped container made of resin made of polypropylene, for example. The air cleaner case 61 has an end wall portion 611 formed in a slightly vertically long rectangular shape, and a side wall portion 612 provided so as to surround the four peripheries of the end wall portion 611. The end wall portion 611 is disposed so as to face the lateral direction (Y1-Y2 direction) of the general-purpose engine 1. The side wall portion 612 is provided so as to protrude at a predetermined height toward the opposite side of the carburetor 60 from the four peripheries of the end wall portion 611 (direction Y1 side).

At a slightly forward (direction X1) and slightly upward (direction Z1) position than the central portion of the end wall portion 611, one circular opening 613 for feeding the intake air to the intake port 60*a* is provided. The opening 613 communicates with the intake port 60*a* provided in the carburetor 60.

Furthermore, the end wall portion 611 has two sleeve-shaped through holes 614*a* and 614*b*. The through holes 614*a* and 614*b* are disposed at positions where the opening 613 is interposed therebetween. Fixtures 601 and 601 such as two bolts for mounting the air cleaner case 61 to the carburetor 60 are inserted into the through holes 614*a* and 614*b*. Of these two through holes 614*a* and 614*b*, the through hole 614*a* disposed on the front side (direction X1 side) of the opening 613 is disposed slightly below the center of the opening 613 in the height direction. Furthermore, the through hole 614*b* disposed on the back side (direction X2 side) of the opening 613 is disposed slightly above the center of the opening 613 in the height direction. The two fixtures 601 and 601 are configured to pass through the through holes 614*a* and 614*b*, respectively, and to be screwed into the corresponding mounting holes 60*b* and 60*b* on the carburetor 60 side, respectively.

Furthermore, the side wall portion 612 has a first mounting leg portion 615 protruding toward the carburetor 60 side, and a second mounting leg portion 616. The first mounting leg portion 615 is disposed in the lower wall portion 612*c* provided at the lower portion of the side wall portion 612. The first mounting leg portion 615 extends to project greatly from the lower wall portion 612*c* toward the carburetor 60. The second mounting leg portion 616 is provided so as to protrude further forward and downward from the lower portion of the front side wall portion 612*b* disposed at the front portion of the side wall portion 612. A through hole 615*a* is provided at the tip of the first mounting leg portion 615. Furthermore, a through hole 616*a* is provided at a lower end portion of the second mounting leg portion 616. The fixtures 602 and 602 such as bolts and nuts pass through these through holes 615a and 616a, respectively, and are configured to be screwed into corresponding mounting holes 60c and 60c, respectively, on the engine body 10 side.

The air cleaner case 61 is thus mounted to the carburetor 60 and the engine body 10 by the fixtures 601, 601, 602, and 602. At this time, the opening 613 communicates with the intake port 60a of the carburetor 60.

The air filter 62 shown in the present embodiment is an embodiment of a filter part. The air filter 62 is a square-shaped filter member which is substantially equal to the internal shape surrounded by the side wall portion 612 of the air cleaner case 61. The air filter 62 is accommodated so as to fit inside the side wall portion 612 of the air cleaner case 61. Thus, the intake air (air) purified by passing through the air filter 62 is sent to the intake port 60a of the carburetor 60 through the opening 613. A plurality of support protrusions 611a for supporting the air filter 62 accommodated inside the side wall portion 612 at a predetermined separation distance from the end wall portion 611 is provided to protrude from a surface of the end wall portion 611 on the air filter 62 side.

The cover 63 shown in the present embodiment is an embodiment of a cover portion. The cover 63 is disposed outermost in the air cleaner 6 and covers the outside of the air cleaner case 61 for accommodating the air filter 62. The cover 63 has an upper cover portion 631 extending to cover the upper portion of the air cleaner case 61 at the upper portion of the cover 63. The upper cover portion 631 is disposed so as to cover the upper portion of the cover mounting portion 617 provided at the upper wall portion 612a disposed at the upper portion of the side wall portion 612 of the air cleaner case 61. Furthermore, the cover 63 has a flange portion 632a. In order to prevent the choke lever 65 configuring the opening/closing mechanism 6A of the present embodiment from being erroneously operated due to the application of stress from the outside, the flange portion 632a thereof is formed so as to protrude from the cover body 632, and covers the holding portion 652 of the choke lever 65 from the outside.

The cover mounting portion 617 extends in the same direction (direction Y2) as the upper cover portion 631 of the cover 63, and the cover mounting portion 617 is disposed so as to cover the upper portion of the carburetor 60 together with the upper cover portion 631. The cover mounting portion 617 has a through hole 617a in which a female screw is formed. The fixture 603 such as a bolt is screwed into the through hole 617a through the through hole 631a provided in the upper cover portion 631 of the cover 63, whereby the cover 63 is mounted to the air cleaner case 61.

Figure 16:
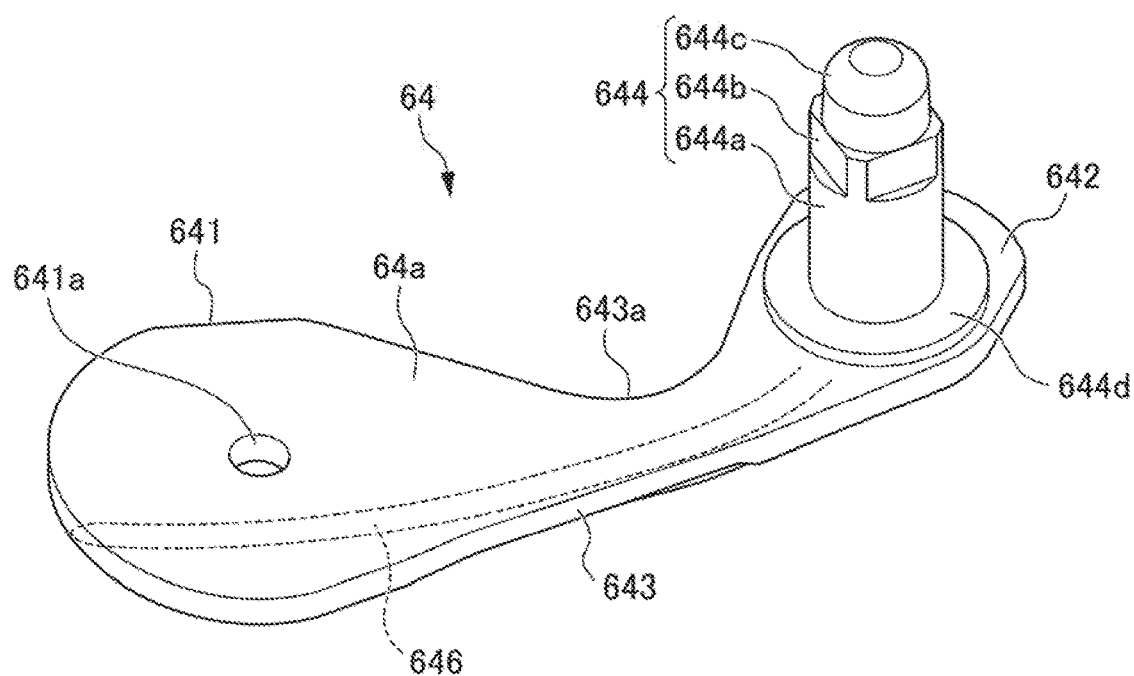
FIG. 16 is a perspective view of an opening/closing member according to an embodiment of the present invention as viewed from a coupling side with a working member.
Figure 17:
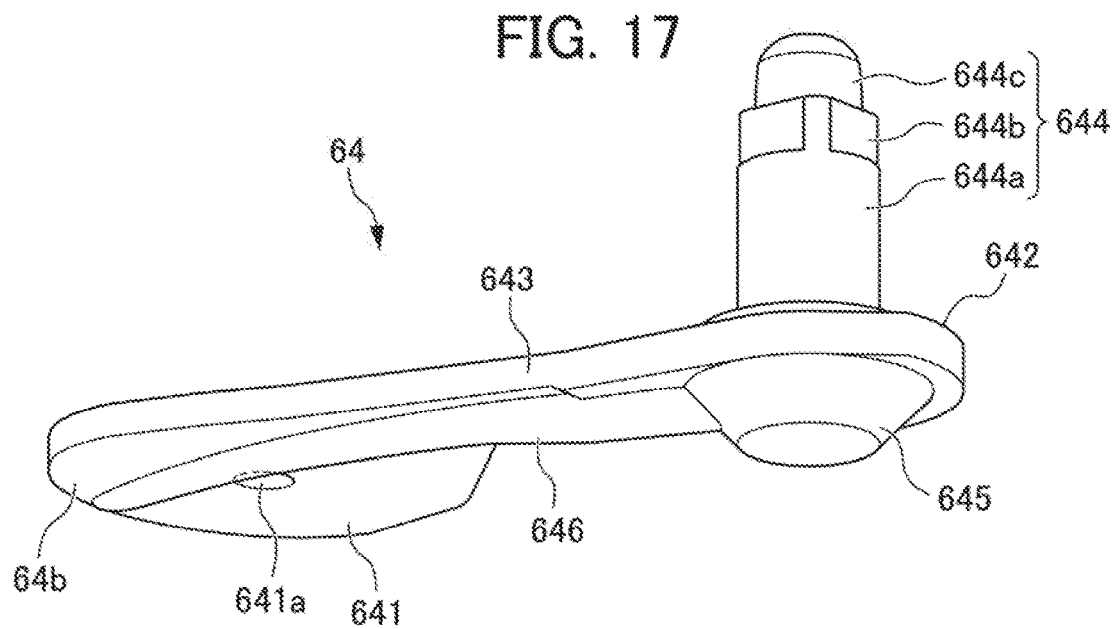
FIG. 17 is a perspective view of an opening/closing member according to an embodiment of the present invention as viewed from a side opposite to the coupling side with the working member.
Figure 18:
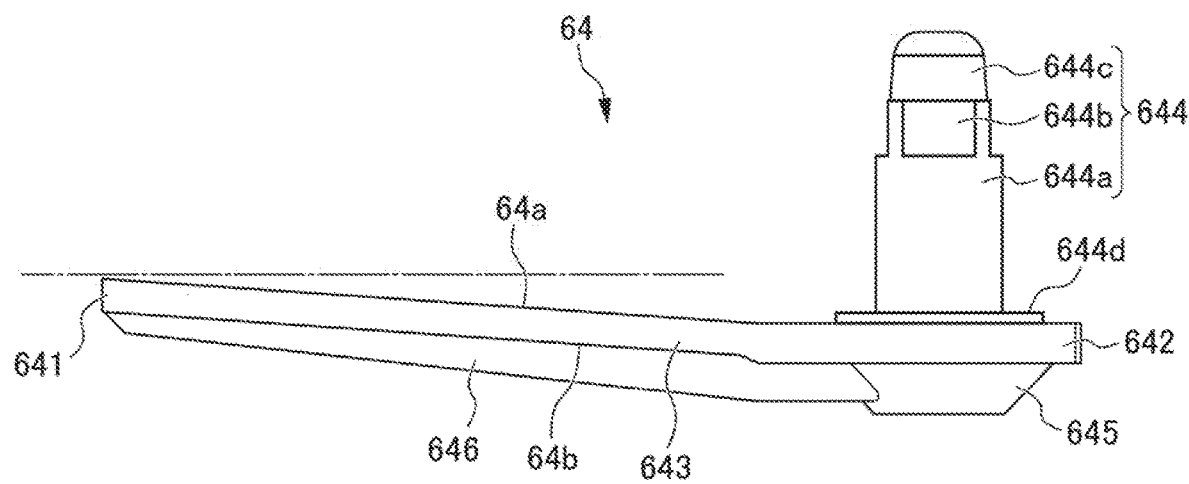
FIG. 18 is a plan view of an opening/closing member according to an embodiment of the present invention.
Figure 19:
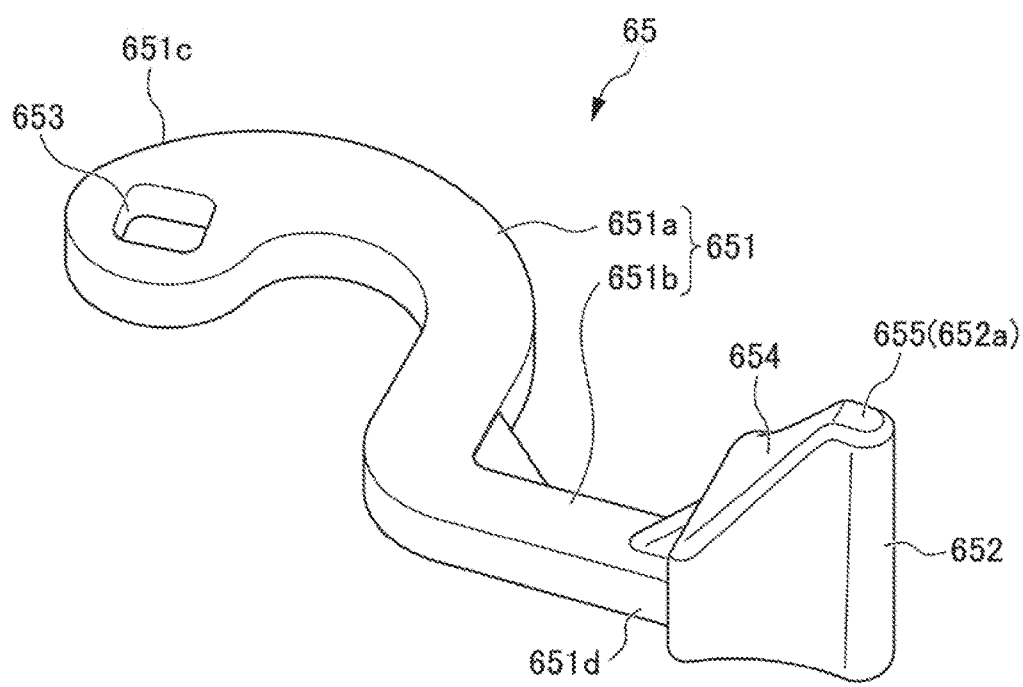
FIG. 19 is a perspective view of a working member according to an embodiment of the present invention as viewed from a coupling side with an opening/closing member.
Figure 20:
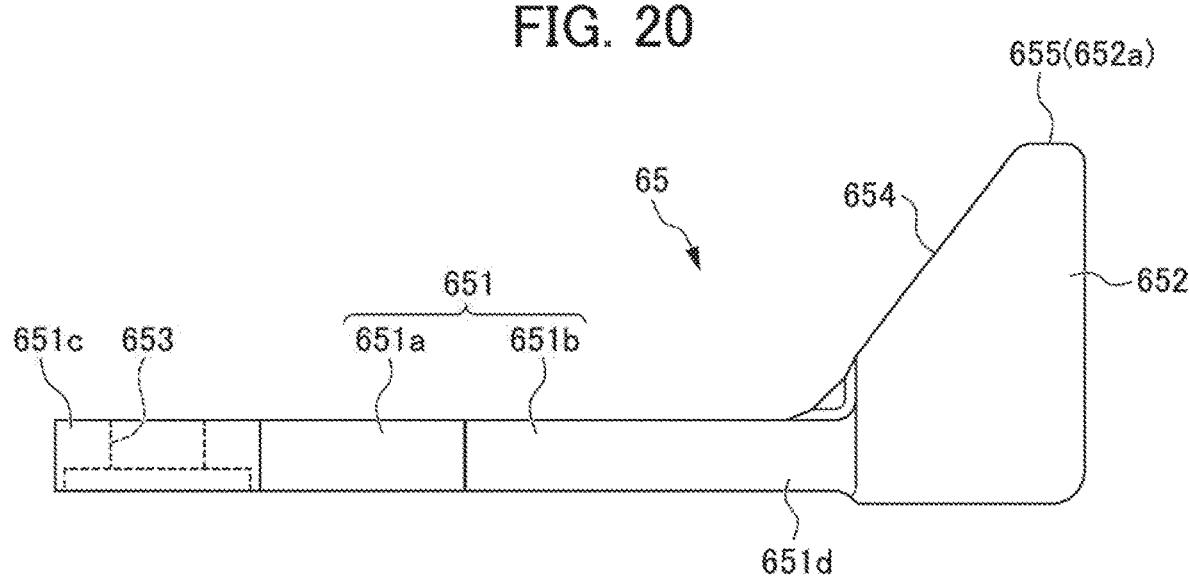
FIG. 20 is a bottom view of a working member according to an embodiment of the present invention.

Next, the opening/closing mechanism 6A will be further described with reference to FIGS. 16 to 20. FIG. 16 is a perspective view of an opening/closing member according to an embodiment of the present invention as viewed from a coupling side with a working member. FIG. 17 is a perspective view of an opening/closing member according to an embodiment of the present invention as viewed from a side opposite to the coupling side with the working member. FIG. 18 is a plan view of an opening/closing member according to an embodiment of the present invention. FIG. 19 is a perspective view of a working member according to an embodiment of the present invention as viewed from a coupling side with an opening/closing member. FIG. 20 is a bottom view of a working member according to an embodiment of the present invention. The opening/closing mechanism 6A is mounted to the air cleaner case 61. The opening/closing mechanism 6A of the present embodiment opens and closes the opening 613 of the air cleaner case 61 by being operated by an operator handling the general-purpose engine 1, and adjusts the intake air volume that is fed into the intake port 60a of the carburetor 60 through the opening 613.

In the present embodiment, the opening/closing mechanism 6A includes a choke valve 64 and a choke lever 65. The choke valve 64 is disposed on the surface of the air filter 62 side (the outer surface) at the end wall portion 611 of the air cleaner case 61. The choke lever 65 is disposed on the surface (inner surface) of the carburetor 60 side at the end wall portion 611 of the air cleaner case 61. The choke valve 64 is an embodiment of the opening/closing member, and the choke lever 65 is an embodiment of the working member.

The choke valve 64 is disposed between the air filter 62 and the end wall portion 611. The choke valve 64 is a thin plate-like member made of resin made of polyacetal, for example. As shown in FIGS. 16 to 18, the choke valve 64 includes a valve body plate portion 641, a coupling plate portion 642, and a connecting plate portion 643. The valve body plate portion 641 has a substantially circular shape and has a size sufficient to cover the opening 613 of the air cleaner case 61. The coupling plate portion 642 is formed so as to have a slightly smaller diameter than the valve body plate portion 641, and is coupled to the choke lever 65. The connecting plate portion 643 has a narrowed shape, and integrally connects the valve body plate portion 641 and the coupling plate portion 642. The small-diameter hole 641a is provided at the center portion of the valve body plate portion 641. The small-diameter hole 641a is configured so that, even if the valve body plate portion 641 completely closes the opening 613, the air filter 62 side and the intake port 60a of the carburetor 60 are caused to communicate with each other, thereby allowing a small amount of intake air to be fed to the carburetor 60 side.

The engaging shaft portion 644 which is engaged with the choke lever 65 and serves as a pivot axis during the opening and closing operation of the choke valve 64 is provided to protrude on one surface of the coupling plate portion 642. The engaging shaft portion 644 has a first cylindrical portion 644a, a prism portion 644b, and a second cylindrical portion 644c. The first cylindrical portion 644a rises vertically from the coupling plate portion 642. The prism portion 644b is continuously disposed at the tip of the first cylindrical portion 644a. The second cylindrical portion 644c is continuously disposed at the tip of the prism portion 644b. The prism portion 644b in the present embodiment is a square prism. The maximum diameter of the prism portion 644b (length of the diagonal line) is substantially equal to the outer diameter of the first cylindrical portion 644a. The outer diameter of the second cylindrical portion 644c is slightly smaller than the outer diameter of the first cylindrical portion 644a, and is substantially equal to the distance between the opposing side surfaces of the prism portion 644b. It should be noted that a circular pedestal portion 644d having a larger diameter than the first cylindrical portion 644a is provided at the base portion of the engaging shaft portion 644. The pedestal portion 644d mainly serves as a seating portion of an O-ring 647 to be described later.

In the coupling plate portion 642, the reinforcing portion 645 having a frustoconical shape is provided on the surface opposite to the engaging shaft portion 644. By reinforcing the coupling plate portion 642 of the choke valve 64 in a thick shape, the reinforcing portion 645 is configured such that the operating force (rotational force) from the choke lever 65 through the engaging shaft portion 644 is efficiently transmitted.

Furthermore, the linear reinforcing rib 646 extending from the reinforcing portion 645 to the valve body plate portion 641 is provided on the surface 64b opposite to the protrusion side of the engaging shaft portion 644 in the choke valve 64. The reinforcing rib 646 suppresses the occurrence of excessive deflection of the choke valve 64.

As shown in FIG. 18, the choke valve 64 is provided so as to be sloped gradually in the same direction as the protruding direction of the engaging shaft portion 644 as going from the coupling plate portion 642 toward the valve body plate portion 641. The surface 64a of the sloped direction side (the protrusion side of the engaging shaft portion 644) in the choke valve 64 is a surface which is mounted along the end wall portion 611 of the air cleaner case 61. Therefore, when the choke valve 64 is mounted along the end wall portion 611 of the air cleaner case 61, the valve body plate portion 641 side is elastically close to the end wall portion 611. With such a configuration, backlash on the valve body plate portion 641 side is suppressed, and when the opening 613 is closed by the valve body plate portion 641, the periphery of the opening 613 is satisfactorily sealed.

The choke lever 65 is disposed on the side opposite to the side of the opening 613 of the end wall portion 611 on which the choke valve 64 is disposed with the opening 613 of the end wall portion 611 interposed therebetween. The choke lever 65 is a thin plate-like member made of a resin made of polyacetal, for example. As shown in FIGS. 19 and 20, the choke lever 65 includes an arm portion 651 which is coupled to the choke valve 64, and a holding portion 652 serving as a portion to be held and operated by the operator's hand (finger).

The arm portion 651 has a curved portion 651a curved in a substantially semicircular arc shape, and a straight portion 651b extending in a direction orthogonal to one end of the curved portion 651a. An engaging hole 653 having a square-shaped hole is provided at one end portion 651c of the arm portion 651 (at the end of the curved portion 651a opposite to the straight portion 651b). The choke lever 65 is integrally coupled by the engagement of the engaging hole 653 with the prism portion 644b of the engaging shaft portion 644 of the choke valve 64. The prism portion 644b of the choke valve 64 of the present embodiment is configured as a square prism. Therefore, the engaging hole 653 of the choke lever 65 is configured as a square hole corresponding to the square prism.

It should be noted that the engaging structure of the engaging shaft portion 644 of the choke valve 64 and the engaging hole 653 of the choke lever 65 may be an engagement of a cylinder and a circular hole. However, as in the present embodiment, it is preferable that the prism portion 644b of the engaging shaft portion 644 of the choke valve 64 and the engaging hole 653 of the choke lever 65 are engaged. This is because the rotational force around the axis of the engaging shaft portion 644 caused by the operation of the choke lever 65 can be efficiently transmitted without loss to the choke valve 64. However, the prism portion 644b and the engaging hole 653 are not limited to the square prism and the square hole of the present embodiment.

The holding portion 652 is provided integrally with the other end portion 651d of the arm portion 651. The holding portion 652 is provided to be wider than the arm portion 651, and extends so as to project in one direction from the other end portion 651d of the arm portion 651. The one direction in which the holding portion 652 protrudes is a direction intersecting the moving direction of the arm portion 651 around the rotation center of the engaging hole 653. More specifically, as shown in FIGS. 12 to 14, in a state in which the choke lever 65 is mounted to the air cleaner case 61, the holding portion 652 extends along the back wall portion 612d disposed on the back side of the air cleaner case 61 toward the side opposite to the carburetor 60 (the cover 63 side, direction Y1 side).

The holding portion 652 has such a width that allows an operator to hold by picking from above and below by a hand (finger) of the operator. The width is not specifically limited. In the present embodiment, the holding portion 652 has a width of up to about 15 mm. Here, as shown in FIG. 19 and FIG. 20, the holding portion 652 has a notch portion 654 that is obliquely notched on the surface facing the back wall portion 612d of the air cleaner case 61 so as to gradually become narrower in width as going to the connection portion with the arm portion 651 (the straight portion 651b), in other words, so as to be spaced apart from the back wall portion 612d. In addition, the holding portion 652 of the present embodiment has a flat surface portion 655 which is continuous with the notch portion 654 at a side end portion 652a facing the cover 63. By providing the flat surface portion 655 to the holding portion 652, even if the end of the holding portion 652 in the width direction has the notch portion 654 that is cut obliquely, the tip thereof is not a pointed shape.

It should be noted that, when viewed from the direction in which the flat surface portion 655 is disposed, since the holding portion 652 is provided to be gradually wider (thicker) toward the connection portion with the arm portion 651, it is easier for the operator to pick the holding portion 652 by a hand (fingers). Furthermore, as shown in FIGS. 12, 13, 15, and 19, this wider (thicker) portion is provided in a curved shape. For this reason, the holding portion 652 can be easily picked by following the shape of the operator's hand (fingers).

The choke lever 65 is inserted into the guide hole 66 provided in the air cleaner case 61. The arm portion 651 of the choke lever 65 is inserted into the guide hole 66, and the guide hole 66 linearly and smoothly guides the movement of the arm portion 651 during the operation of the choke lever 65. The guide hole 66 is provided at the upper portion of the back wall portion 612d of the side wall portion 612 so as to open in the front-back direction (X1-X2 direction) of the air cleaner case 61. More specifically, the guide hole 66 is formed so as to have an elongated shape in the vertical direction by an inner space surrounded by the two upper and lower movement direction regulating portions 661a and 661b and a transfer frame portion 662.

The movement direction regulating portions 661a and 661b are provided so as to project further backward (on the direction X2 side) from the back wall portion 612d of the air cleaner case 61 and toward the side opposite to the air filter 62 (the carburetor 60 side, the direction Y2 side). The movement direction regulating portions 661a and 661b regulate the vertical movement range of the arm portion 651 when the choke lever 65 is operated. The transfer frame portion 662 is provided over the tips of the two movement direction regulating portions 661a and 661b. The transfer frame portion 662 guides the moving direction of the arm portion 651 during the operation of the choke lever 65. As shown in FIG. 15, the transfer frame portion 662 is disposed to be shifted to the back side (the direction X2 side) with respect to the back wall portion 612d of the air cleaner case 61, and extends along the back wall portion 612d. The movement direction regulating portions 661a and 661b and the transfer frame portion 662 are integrally molded with the air cleaner case 61 by the same resin as the air cleaner case 61.

The arm portion 651 of the choke lever 65 is disposed along the end wall portion 611 through the guide hole 66. On the other hand, the holding portion 652 is disposed so as to protrude from the guide hole 66 to the side of the back wall portion 612d in the direction X2. At this time, the notch portion 654 and the flat surface portion 655 of the holding portion 652 are arranged so as to face the side opposite to the carburetor 60 (the cover 63 side).

Figure 21:
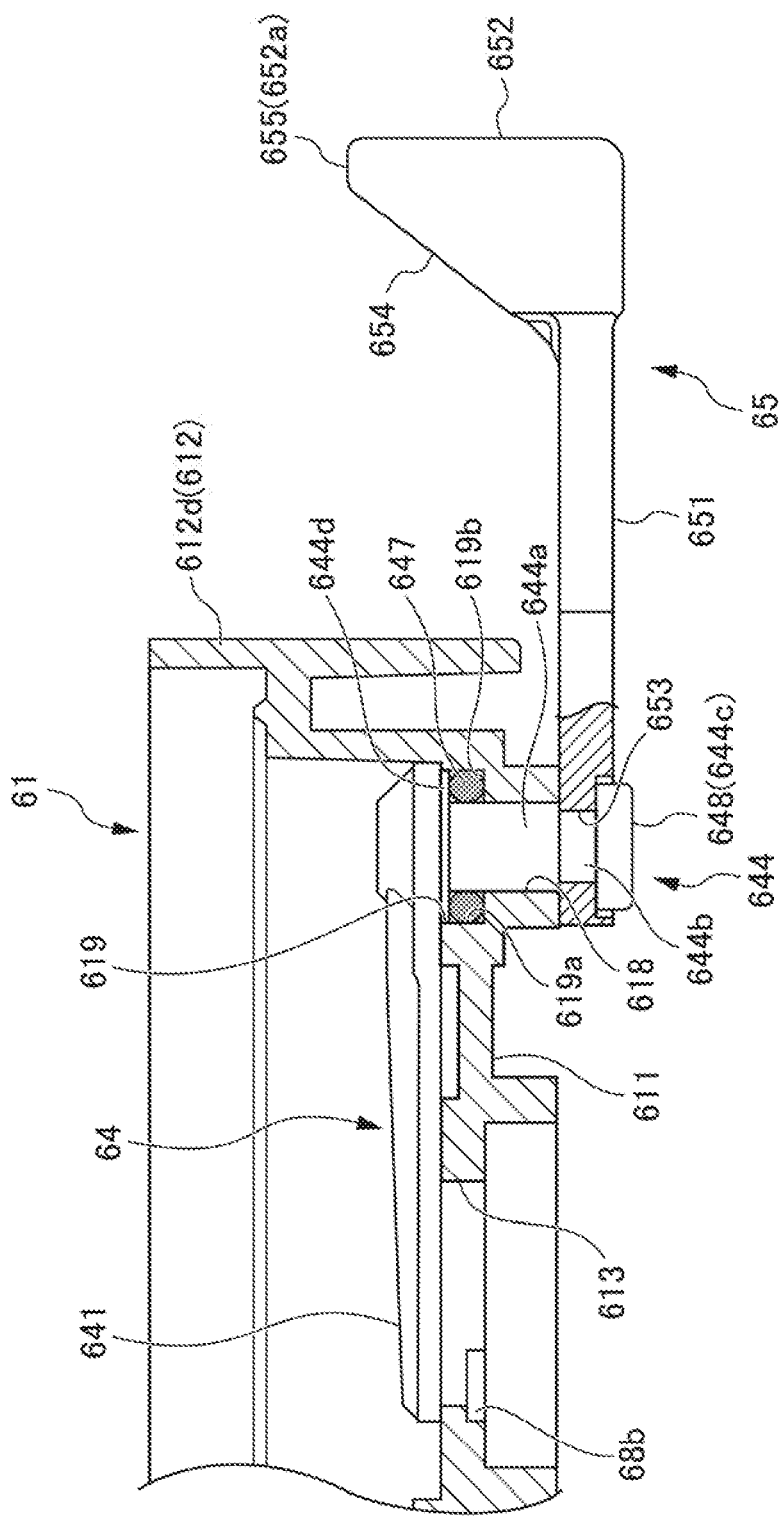
FIG. 21 is a cross-sectional view showing a mounting structure of the opening/closing member and the working member in the intake member according to an embodiment of the present invention.

Next, the mounting structure of the choke valve 64 and the choke lever 65 will be described with reference to FIG. 21. FIG. 21 is a cross-sectional view showing a mounting structure of the opening/closing member and the working member in the intake member according to an embodiment of the present invention. FIG. 21 shows a cross section when viewed from the lower side of the air cleaner case 61, the illustration of the guide hole 66 is omitted. The choke valve 64 is mounted along the end wall portion 611 from the surface of the air filter 62 side at the end wall portion 611 of the air cleaner case 61. Specifically, the engaging shaft portion 644 of the choke valve 64 is inserted into the mounting hole 613 provided in the end wall portion 611 through the O-ring 647, and the engaging shaft portion 644 is disposed so that the valve body plate portion 641 covers the opening 613 or is disposed in the vicinity of the opening 613. The O-ring 647 is an embodiment of an elastic member.

The inner diameter of the mounting hole 618 is substantially equal to the outer diameter of the first cylindrical portion 644a of the engaging shaft portion 644 of the choke valve 64. A housing stepped portion 619 for accommodating the O-ring 647 mounted on the outer periphery of the engaging shaft portion 644 is provided at the end of the air filter 62 side of the mounting hole 618 so that the diameter of the housing stepped portion 619 is slightly larger than the mounting hole 618. The inner diameter of the housing stepped portion 619 is slightly smaller than the outer diameter of the O-ring 647 mounted on the outer periphery of the engaging shaft portion 644. Therefore, when the engaging shaft portion 644 of the choke valve 64 is inserted into the mounting hole 618, the O-ring 647 is elastically in contact with the inner peripheral wall surface 619a of the housing stepped portion 619 and thus sealed, and furthermore, the O-ring 647 is elastically in contact with the bottom surface 619b of the housing stepped portion 619 and thus sealed. As a result, the O-ring 647 is sandwiched between the pedestal portion 644d of the choke valve 64 and the bottom surface 619b of the housing stepped portion 619. The sealing action of the O-ring 647 prevents dust and the like from flowing in from the air filter 62 side to the carburetor 60 side through the opening 613.

The mounting hole 618 is disposed slightly above the through hole 614b provided in the end wall portion 611. As shown in FIG. 16, the connecting plate portion 643 of the choke valve 64 has a concave curved portion 643a which is smoothly recessed so as to avoid the through hole 614b. Therefore, even if the choke valve 64 is disposed in the vicinity of the through hole 614b, the choke valve 64 does not interfere with the through hole 614b, and thus it is possible to reduce the size of the air cleaner case 61.

On the other hand, since the arm portion 651 is inserted from the guide hole 66 of the air cleaner case 61, the choke lever 65 is mounted to the surface opposite to the surface on which the air filter 62 is disposed, at the end wall portion 611. The prism portion 644b and the second cylindrical portion 644c of the engaging shaft portion 644 of the choke valve 64 project from the mounting hole 618 on the surface of the end wall portion 611 of the air cleaner case 61 opposite to the air filter 62. The engagement is performed by inserting the prism portion 644b of the engaging shaft portion 644 protruding from the mounting hole 618 into the engaging hole 653 of the choke lever 65. The size (inner dimension) of the engaging hole 653 is formed slightly smaller than the size (outer dimension) of the prism portion 644b. Therefore, the engaging hole 653 and the prism portion 644b are engaged by being lightly press-fitted.

When the engaging shaft portion 644 of the choke valve 64 is pushed toward the mounting hole 618 and further pressed into the engaging hole 653 of the choke lever 65, the O-ring 647 is further squeezed between the pedestal portion 644d and the bottom surface 619b of the housing stepped portion 619, and the second cylindrical portion 644c of the engaging shaft portion 644 protrudes from the engaging hole 653. In this state, the second cylindrical portion 644c protruding from the engaging hole 653 is thermally caulked to form a caulking portion 648, whereby the choke valve 64 and the choke lever 65 are integrally coupled. At this time, the O-ring 647 exerts an elastic repulsion force along the axial direction (direction Y1-Y2) of the engaging shaft portion 644 between the pedestal portion 644d of the choke valve 64 and the bottom surface 619b of the housing stepped portion 619. This reduces backlash between the choke valve 64 and the choke lever 65, and the end wall portion 611.

The opening/closing mechanism 6A including the choke valve 64 and the choke lever 65 mounted on the air cleaner case 61 opens and closes the opening 613 of the air cleaner case 61 by the holding portion 652 of the choke lever 65 being held and moved along the guide hole 66 by the operator's hand (fingers).

Figure 22:
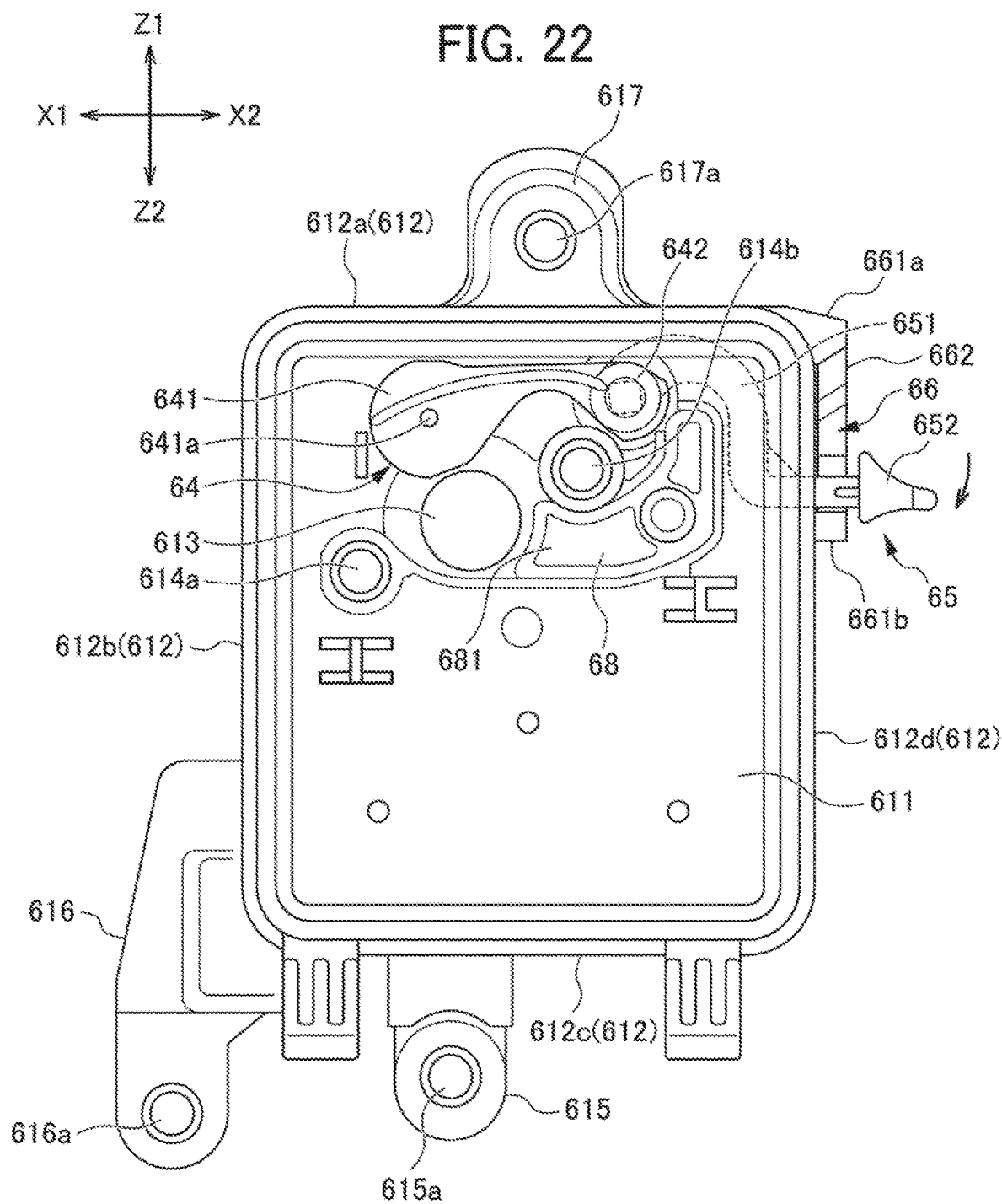
FIG. 22 is a diagram showing a state in which an opening in an intake member according to an embodiment of the present invention is opened.
Figure 23:
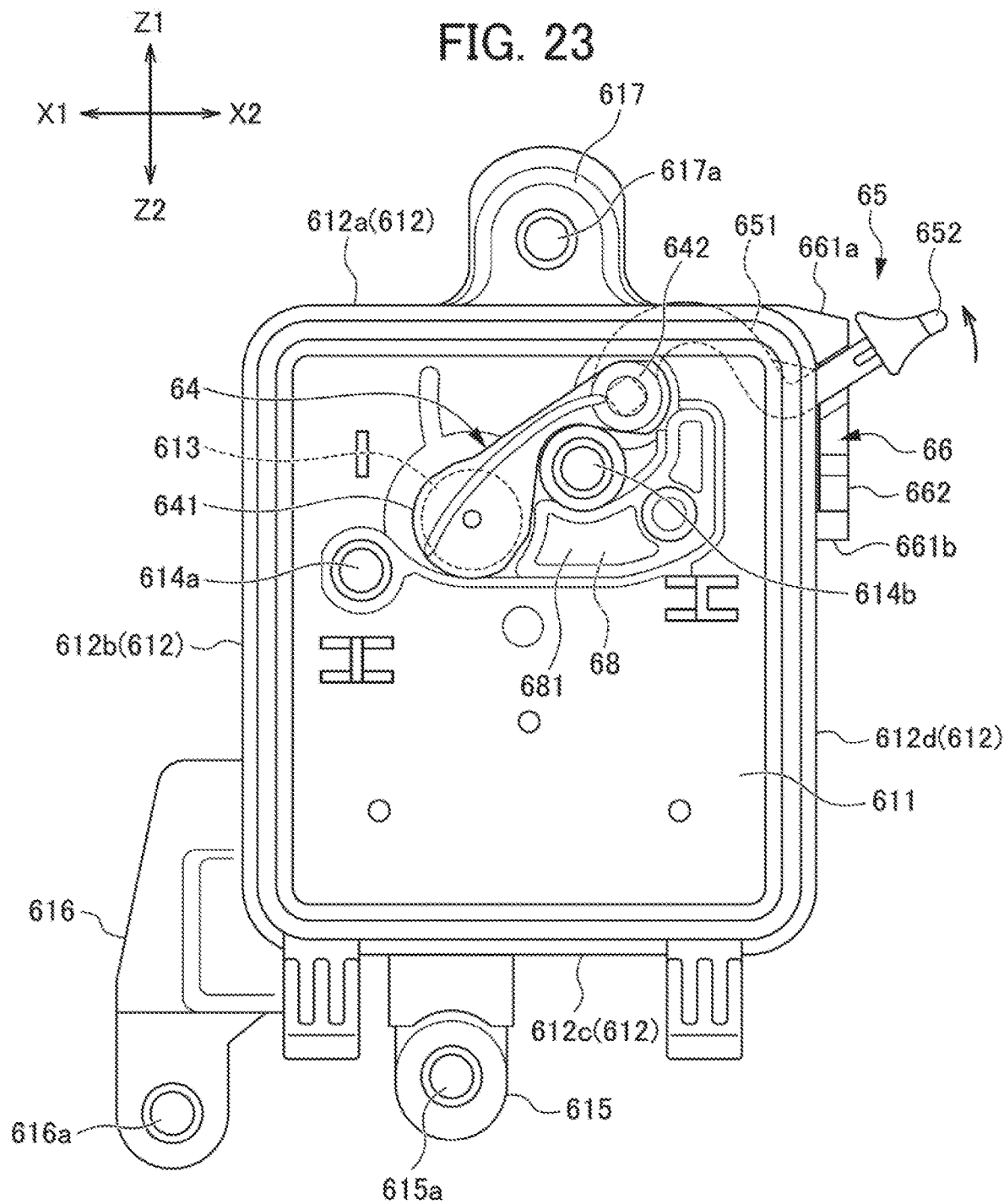
FIG. 23 is a diagram showing a state in which the opening in the intake member according to the embodiment of the present invention is closed.
Figure 24:
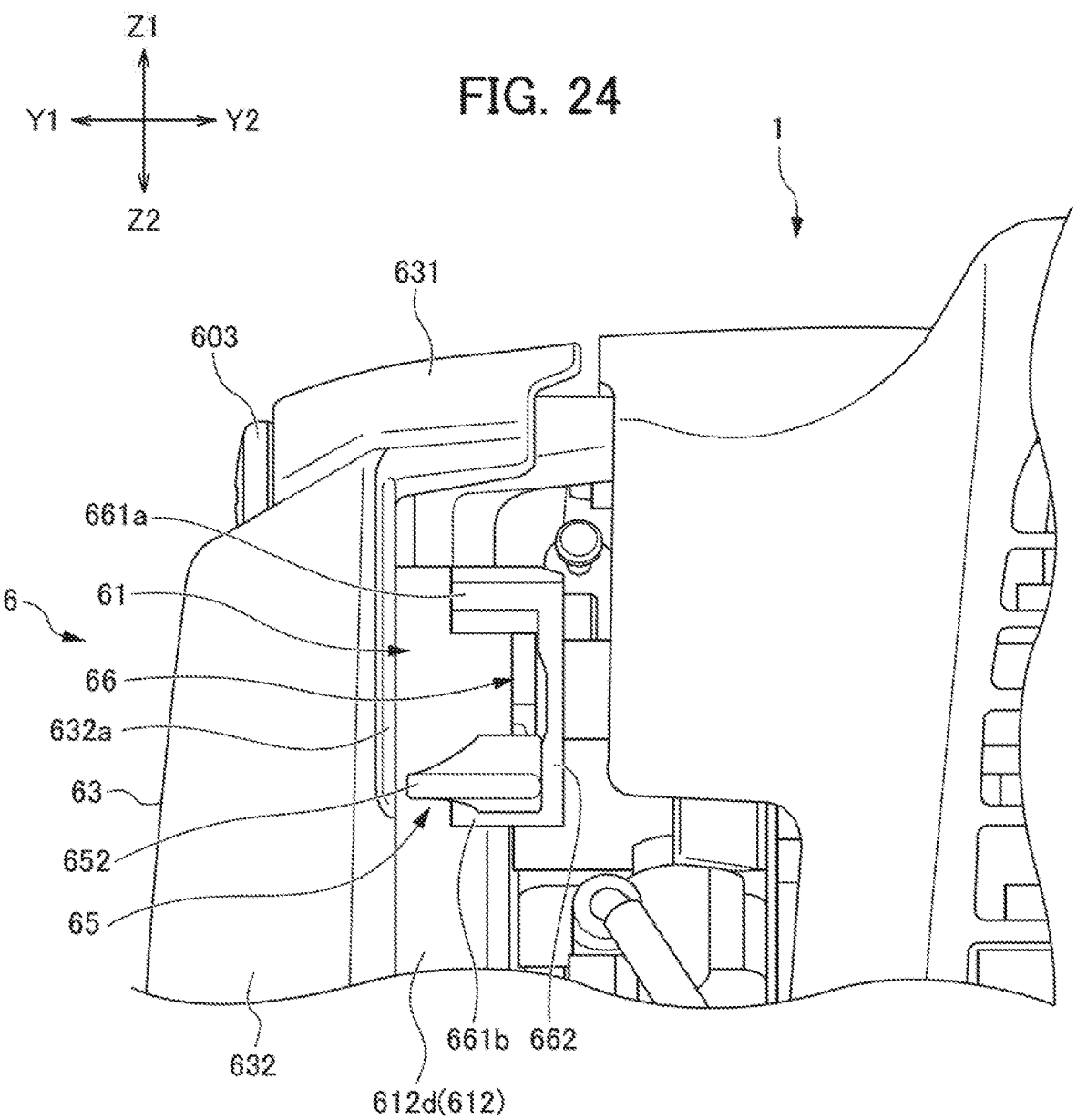
FIG. 24 is a view showing the position of the working member when the opening in the intake member according to an embodiment of the present invention is opened.
Figure 25:
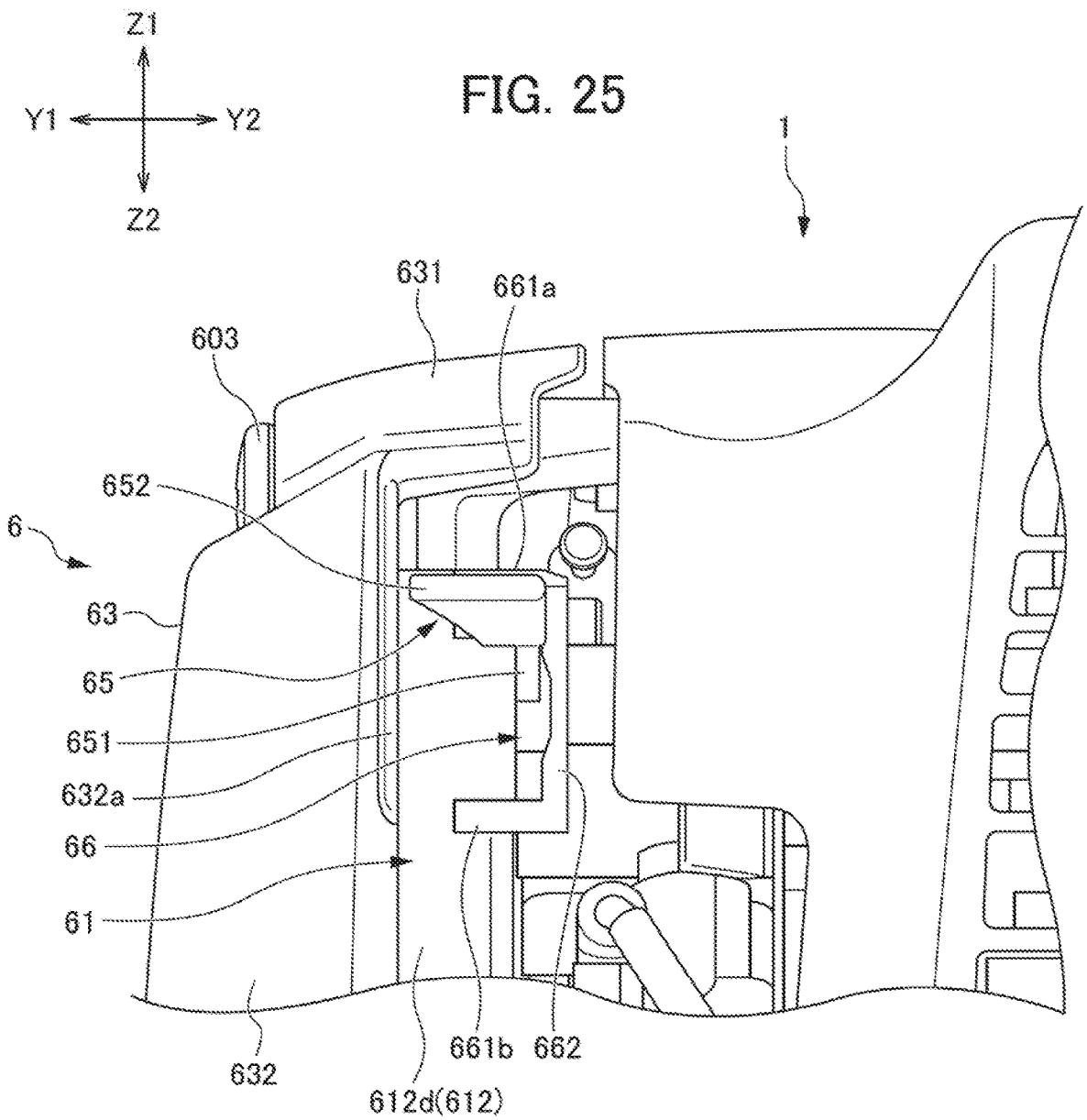
FIG. 25 is a view showing the position of the working member when the opening in the intake member according to the embodiment of the present invention is closed.
Figure 26:
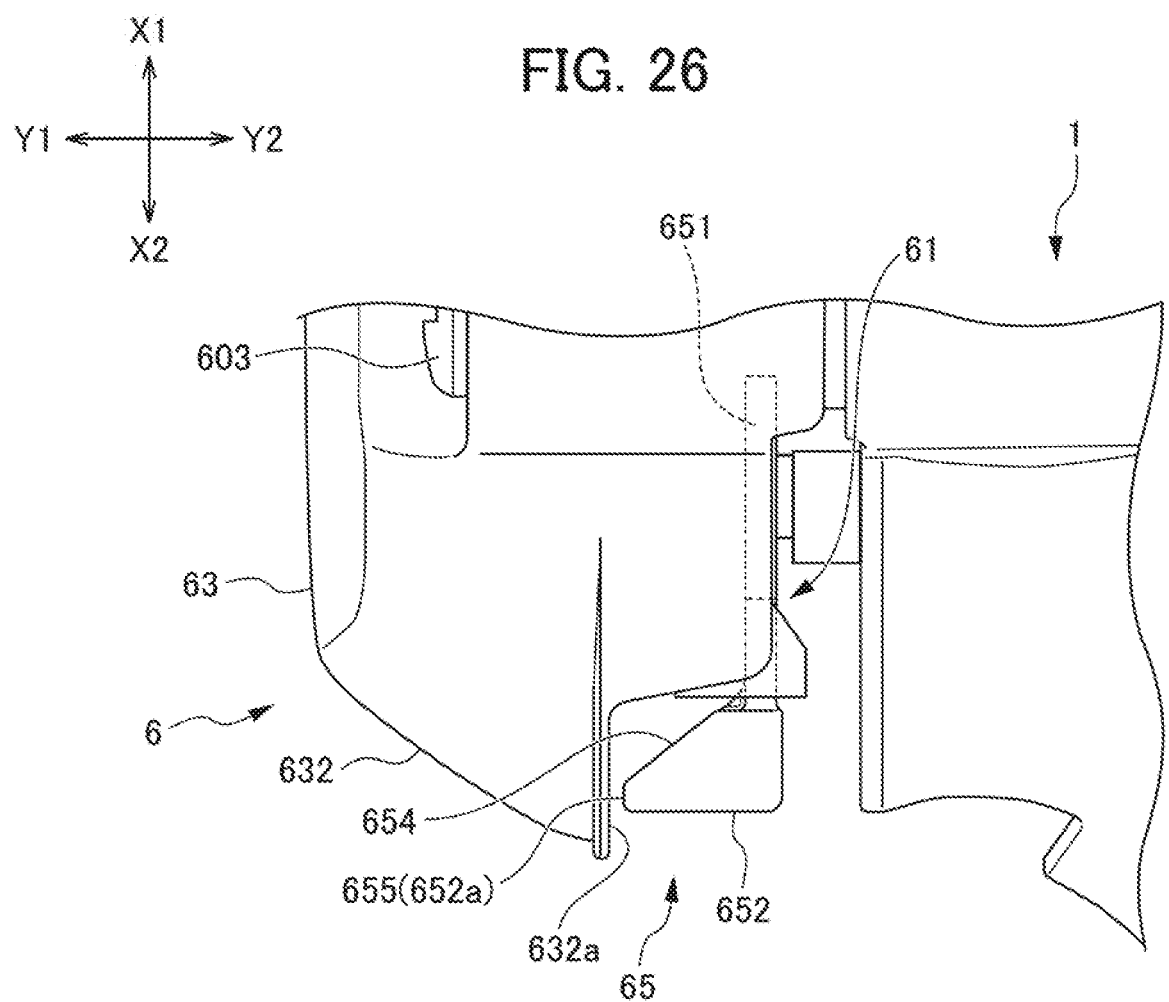
FIG. 26 is a plan view showing an arrangement relationship between the working member and the cover portion according to an embodiment of the present invention.

Here, the opening and closing operation of the opening 613 by the opening/closing mechanism 6A in the present embodiment will be further described with reference to FIGS. 22 to 26. FIG. 22 is a diagram showing a state in which an opening in an intake member according to an embodiment of the present invention is opened. FIG. 23 is a diagram showing a state in which an opening in an intake member according to an embodiment of the present invention is closed. FIG. 24 is a view showing the position of the working member when the opening in the intake member is opened according to the embodiment of the present invention. FIG. 25 is a view showing the position of the working member when the opening of the intake member is closed according to the embodiment of the present invention. FIG. 26 is a plan view showing an arrangement relationship between the working member and the cover portion according to an embodiment of the present invention.

As shown in FIGS. 22 and 24, when the choke lever 65 is operated and moved downward so that the holding portion 652 is disposed at the lower end of the guide hole 66, the valve body plate portion 641 side of the choke valve 64 is rotated upward and the valve body plate portion 641 is moved above the opening 613 around the engaging shaft portion 644 to open the opening 613 (open state). As a result, the opening 613 is fully opened, and the intake air purified by passing through the air filter 62 is fed to the intake port 60a of the carburetor 60 through the opening 613, whereby the fuel ratio to the intake air decreases. The position of the choke valve 64 and the choke lever 65 at this time is a position during normal operation of the general-purpose engine 1.

On the other hand, as shown in FIGS. 23 and 25, when the choke lever 65 is operated and moved downward as the holding portion 652 is disposed on the upper end of the guide hole 66, the valve body plate portion 641 side of the choke valve 64 is rotated downward and the valve body plate portion 641 is moved so as to cover the opening 613 around the engaging shaft portion 644 to close the opening 613 (closed state). As a result, the opening 613 is substantially closed, and the intake air purified by passing through the air filter 62 is only fed from the small-diameter hole 641a of the valve body plate portion 641 to the intake port 60a of the carburetor 60 through the opening 613, whereby the fuel ratio to the intake air increases. The position of the choke valve 64 and the choke lever 65 at this time is a position at the start of the general-purpose engine 1.

Here, since the holding portion 652 of the choke lever 65 has the flat surface portion 655, as shown in FIG. 26, even if the cover 63 is disposed closer to the air cleaner case 61 side, it is possible to secure the clearance between the holding portion 652 and the flange portion 632a protruding from the cover body 632. Therefore, interference between the flange portion 632a of the cover 63 and the holding portion 652 can be avoided. Therefore, the cover 63 can be brought as close as possible to the air cleaner case 61, so that the air cleaner 6 and the general-purpose engine 2 can be reduced in size. Moreover, even if the holding portion 652 has the notch portion 654, the end of the cover 63 side is not an acute angle but the flat surface portion 655. Thus, even when the holding portion 652 is operated by a hand (fingers), an unpleasant impression is not given to the operator, and thus, the choke lever 65 is excellent in operability. Furthermore, since the thin portion of the tip which is not utilized efficiently as the holding portion 652 is cut off to establish the flat surface portion 655, both maintenance of operability and reduction in size can be achieved.

Figure 27:
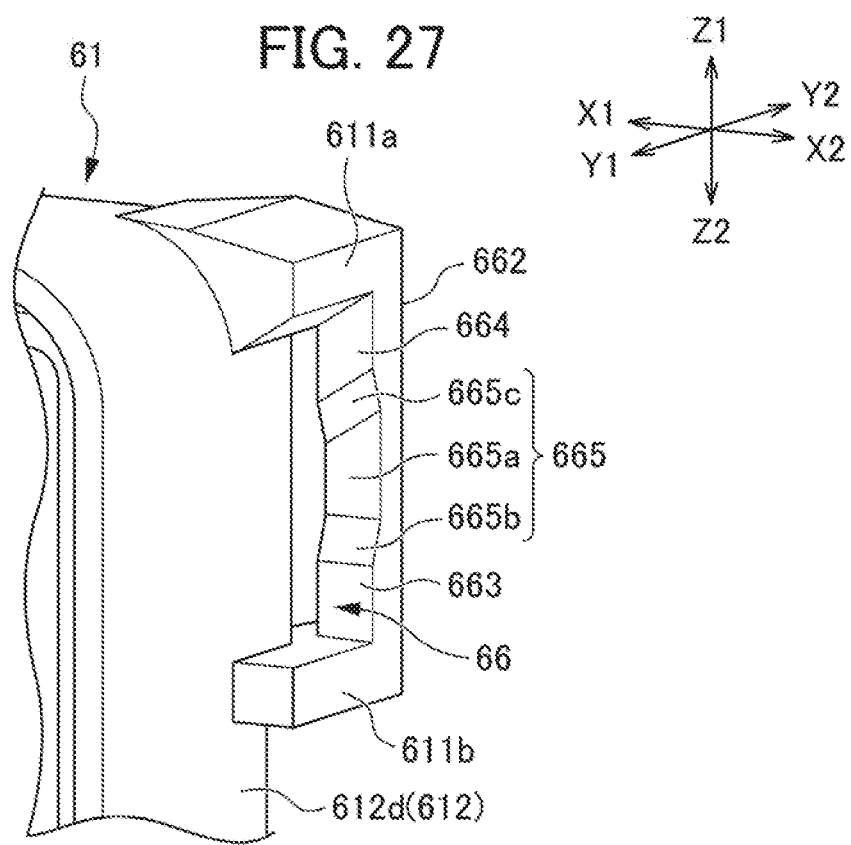
FIG. 27 is an enlarged perspective view of a guide hole of an intake member according to an embodiment of the present invention.
Figure 28:
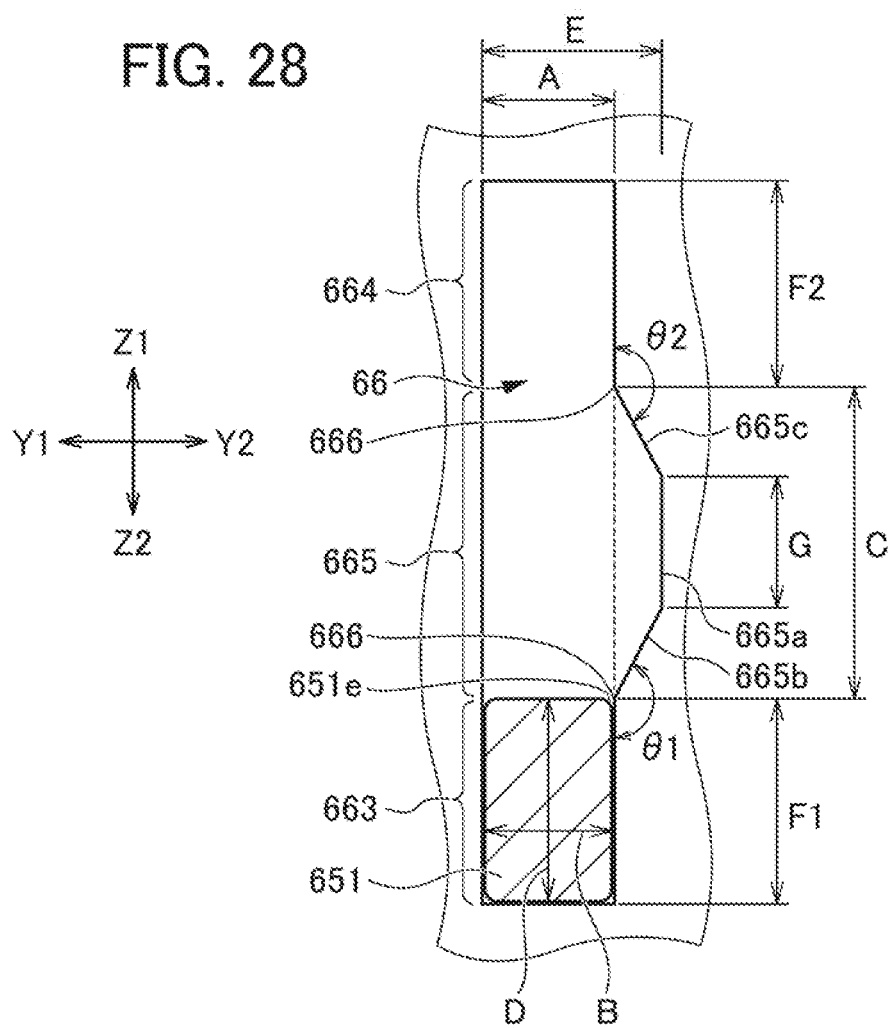
FIG. 28 is a view showing the position of an arm portion of the working member in a state in which the opening in the guide hole of the intake member according to an embodiment of the present invention is opened.
Figure 29:
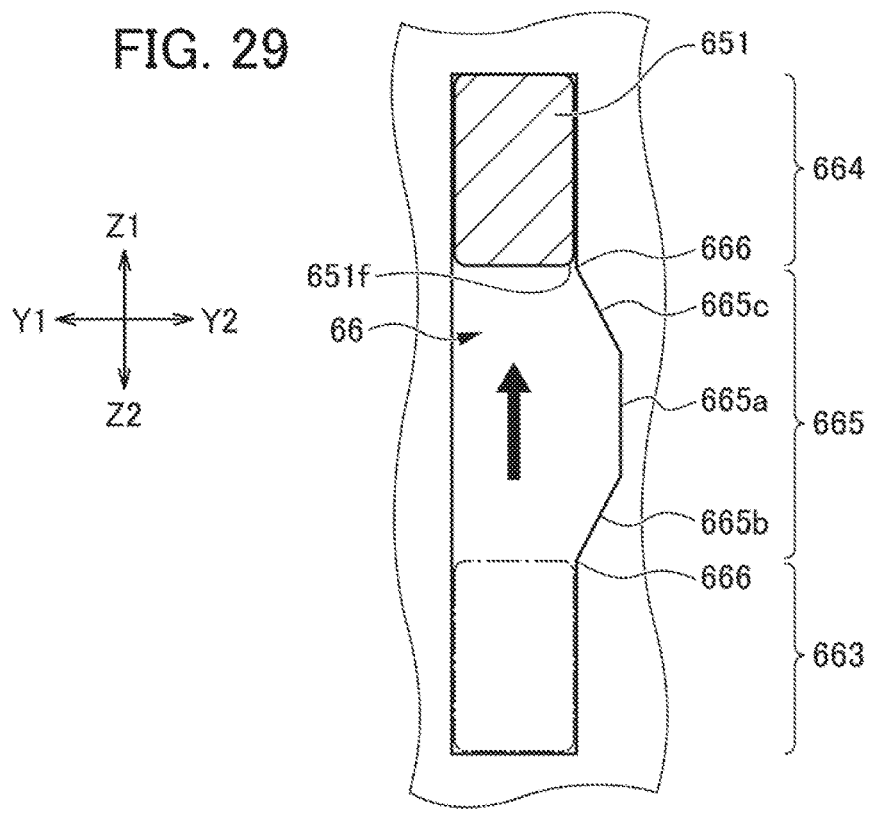
FIG. 29 is a view showing the position of the arm portion of the working member in a state in which the opening in the guide hole of the intake member according to the embodiment of the present invention is closed.
Figure 30:
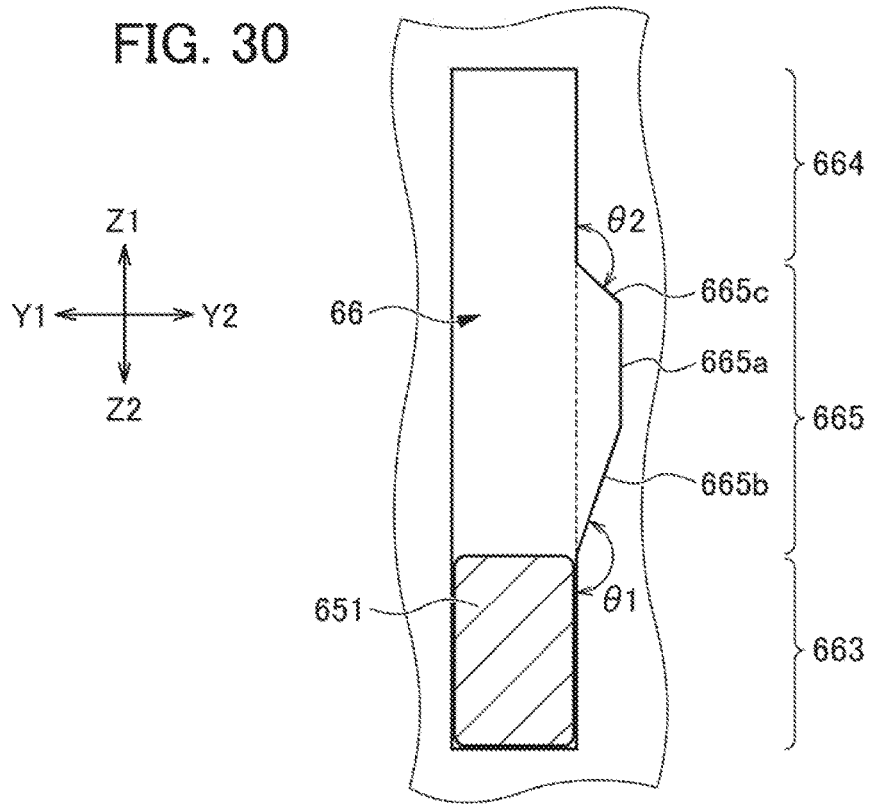
FIG. 30 is a view showing another embodiment of the guide hole of the intake member.

The guide hole 66 will now be described in more detail with reference to FIGS. 27-30. FIG. 27 is an enlarged perspective view of a guide hole of an intake member according to an embodiment of the present invention. FIG. 28 is a view showing the position of the arm portion of the working member in a state in which the opening in the guide hole of the intake member according to the embodiment of the present invention is opened. FIG. 29 is a view showing the position of the arm portion of the working member in a state in which the opening in the guide hole of the intake member according to the embodiment of the present invention is closed. FIG. 30 is a view showing another embodiment of the guide hole of the intake member. In the guide hole 66 of the present embodiment, the side on which the arm portion 651 is positioned when the opening 613 is in the closed state is the upper side of the direction of gravity (direction Z1 side), and the side on which the arm portion 651 is positioned when the opening 613 is in the opened state is the lower side of the direction of gravity (direction Z2 side). Therefore, it is possible to easily operate the choke lever 65 by a natural motion.

The guide hole 66 has a first fixing portion 663 and a second fixing portion 664 for fixing the arm portion 651. The first fixing portion 663 is disposed on one side of the moving direction (the length direction of the guide hole 66) of the arm portion 651 in the guide hole 66, and the second fixing portion 664 is disposed on the other side of the moving direction (the length direction of the guide hole 66) of the arm portion 651 in the guide hole 66. In the present embodiment, the first fixing portion 663 is disposed on the side on which the arm portion 651 is positioned when the opening 613 is in the opened state, that is, on the lower side in the direction of gravity (the direction Z2 side), and the second fixing portion 664 is disposed on the side on which the arm portion 651 is positioned when the opening 613 is in the closed state, that is, on the upper side in the direction of gravity (the direction Z1 side).

The widths (widths in the direction Y1-Y2) of the first fixing portion 663 and the second fixing portion 664 are identical. As shown in FIG. 28, the widths A of the first fixing portion 663 and the second fixing portion 664 are equal to or less than the width B of the arm portion 651 of the choke lever 65 in the guide hole 66 (width in the direction Y1-Y2) (A≤B). As a result, when the arm portion 651 in the guide hole 66 moves to the first fixing portion 663 shown in FIG. 28 or the second fixing portion 664 shown in FIG. 29, the arm portion 651 is sandwiched by the first fixing portion 663 or the second fixing portion 664 and is fixed at the position. Therefore, the choke lever 65 is positioned in the first fixing portion 663 (the position at which the opening 613 is in the opened state) or the second fixing portion 664 (the position at which the opening 613 is in the closed state) without rattling in the guide hole 66 by the driving of the general-purpose engine 1, and the positioned state is maintained. Therefore, while the movement operation is performed to either the opened state or the closed state of the choke lever 65, the choke lever 65 will not rattle by vibration or the like during normal operation of the general-purpose engine 1, it is possible to suppress the occurrence of abnormal noise due to backlash generated in the arm portion 651 when the arm portion 651 is moved in the guide hole 66 and scraped by friction, and suppress a situation in which the operation state becomes unstable due to the movement of the choke valve 64.

As shown in FIGS. 28 and 29, the guide hole 66 has a wide portion 665 between the first fixing portion 663 and the second fixing portion 664. The length C of the wide portion 665 along the length direction of the guide hole 66 (direction Z1-Z2, the moving direction of the arm portion 651) is equal to or greater than the length D of the arm portion 651 (C≥D), and the width (maximum width) E of the wide portion 665 along the width direction (direction (direction Y1-Y2) of the guide hole 66 is greater than the width B of the arm portion 651 (E>B). Thus, when assembling by inserting the choke lever 65 into the guide hole 66, it is possible to easily insert the arm portion 651 of the choke lever 65 to the guide hole 66 by using the wide portion 665. Therefore, the assembling property of the choke lever 65 is improved.

The width E of the wide portion 665 may be equal to or less than double the width B of the arm portions 651 (E≤2B). Thus, during the movement operation of the choke lever 65, it is possible to avoid the entire arm portion 651 completely entering the wide portion 665. Therefore, there is no possibility that the operability of the choke lever 65 will be reduced due to the assembling property of the choke lever 65.

As shown in FIG. 28, the length F1 of the first fixing portion 663 along the length direction of the guide hole 66 and/or the length F2 of the second fixing portion 664 may be equal to or less than the length D of the arm portion 651 along the length direction of the guide hole 66 (F1≤D and/or F2≤D). The guide hole 66 can be formed as small as possible while the arm portion 651 is sandwiched and fixed to the first fixing portion 663 and/or the second fixing portion 664. Therefore, the air cleaner case 61 can be reduced in size.

When the length F1 of the first fixing portion 663 or the length F2 of the second fixing portion 664 is equal to the length D of the arm portion 651 (F1=D or F2=D), the arm portion 651 is visually viewed so as to be disposed adjacent to the wide portion 665. Therefore, as shown in FIGS. 28 and 29, by checking whether or not the position of the corner portion 651e or 651f of the arm portion 651 matches the position of the connection portion 666 with the connection portion (bent portion) 666 of the first fixing portion 663 or the second fixing portion 664 and the wide portion 665 as a reference, it can be easily visually confirmed that the arm portion 651 has moved to the first fixing portion 663 or the second fixing portion 664. The corner portions 651e and 651f of the arm portion 651 are corner portions disposed closest to the wide portion 665 of the four corner portions of the arm portion 651 when the arm portion 651 has been moved to the first fixing portion 663 or the second fixing portion 664. When both the length F1 of the first fixing portion 663 and the length F2 of the second fixing portion 664 are equal to the length D of the arm portion 651 (F1=F2=D), no matter which the arm portion 651 is disposed in the first fixing portion 663 or the second fixing portion 664, it is visually viewed that the positions of the corner portions 651e and 651f of the wide portion 665 and the connection portion 666 are arranged to coincide with each other. Therefore, even when the arm portion 651 is moved to either the first fixing portion 663 or the second fixing portion 664, the completion of the movement can be visually confirmed easily.

The wide portion 665 may have any shape as long as it has a width that allows the arm portion 651 to be inserted. However, the wide portion 665 of the present embodiment is formed to project in a trapezoidal shape toward the direction Y2 from between the first fixing portion 663 and the second fixing portion 664 of the guide hole 66. More specifically, the wide portion 665 has a maximum width portion 665a, a first sloped portion 665b, and a second sloped portion 665c. The first sloped portion 665b couples between the maximum width portion 665a and the first fixing portion 663. The second sloped portion 665c couples the maximum width portion 665a and the second fixing portion 664. Thus, when the arm portion 651 of the choke lever 65 moves between the first fixing portion 663 and the second fixing portion 664, or when the arm portion 651 inserted into the wide portion 665 during assembly of the choke lever 65 moves toward the first fixing portion 663 and the second fixing portion 664, respectively, the arm portion 651 is guided toward the first fixing portion 663 and the second fixing portion 664 by the first sloped portion 665b and the second sloped portion 665c. Therefore, the resistance while moving is reduced. Therefore, it is possible to perform smooth movement operation of the choke lever 65.

Thus, when the wide portion 665 is composed of the maximum width portion 665a, the first sloped portion 665b, and the second sloped portion 665c, the length G of the maximum width portion 665a of the wide portion 665 along the length direction of the guide hole 66 may be shorter than the length D of the arm portion 651 along the length direction of the guide hole 66 (G<D). As a result, the arm portion 651 that has entered the wide portion 665 remains in contact with the first sloped portion 665b and the second sloped portion 665c, and is prevented from completely fitting into the maximum width portion 665a. Therefore, it is possible to perform a smoother movement operation of the choke lever 65.

Furthermore, as shown in FIG. 28, the angle θ1 formed by the hole edge of the first fixing portion 663 and the first sloped portion 665b, and the angle θ2 formed by the hole edge of the second fixing portion 664 and the second sloped portion 665c may be larger than 90°. As a result, it is possible to further reduce the resistance when the arm portion 651 moves from the inside of the wide portion 665 to the first fixing portion 663 and the second fixing portion 664. Therefore, the operability of the choke lever 65 is further improved. It should be noted that the angles θ1 and θ2 are angles formed on the outside of the guide hole 66 at a portion (the connection portion 666) where the first sloped portion 665b and the second sloped portion 665c respectively intersect with the hole edges of the first fixing portion 663 and the second fixing portion 664.

In the guide hole 66 shown in FIGS. 28 and 29, the angle θ1 and angle θ2 are formed so as to be the same angle. However, as shown in FIG. 30, the angle θ1 and the angle θ2 may be different from each other. According to this configuration, it is possible to change the resistance when the arm portion 651 moves from the inside of the wide portion 665 to the first fixing portion 663 and the second fixing portion 664, respectively. Therefore, the operator can sensually identify in which direction of the guide hole 66 the choke lever 65 has moved, and the operability is further improved. It should be noted that, although FIG. 30 shows the case of angle θ1>angle θ2, it may be a case of angle θ1<θ2.

Figure 31:
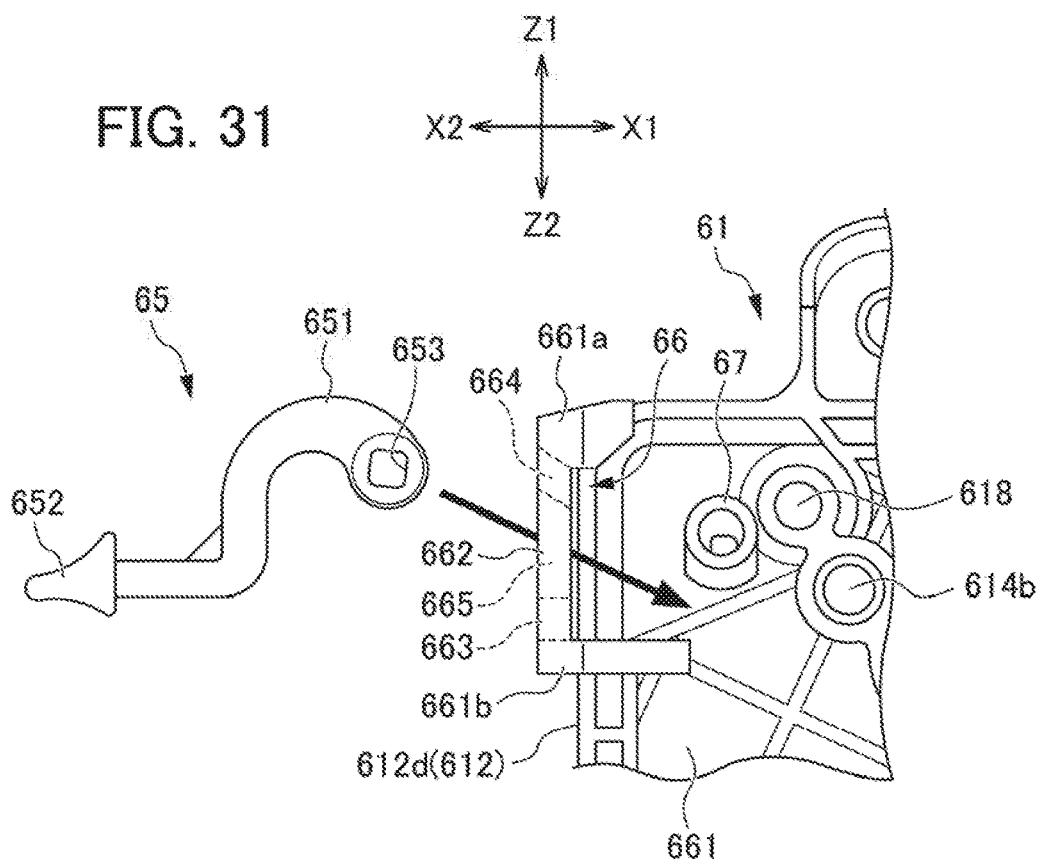
FIG. 31 is a diagram for explaining a step of mounting the working member to the guide hole of the intake member according to an embodiment of the present invention.
Figure 32:
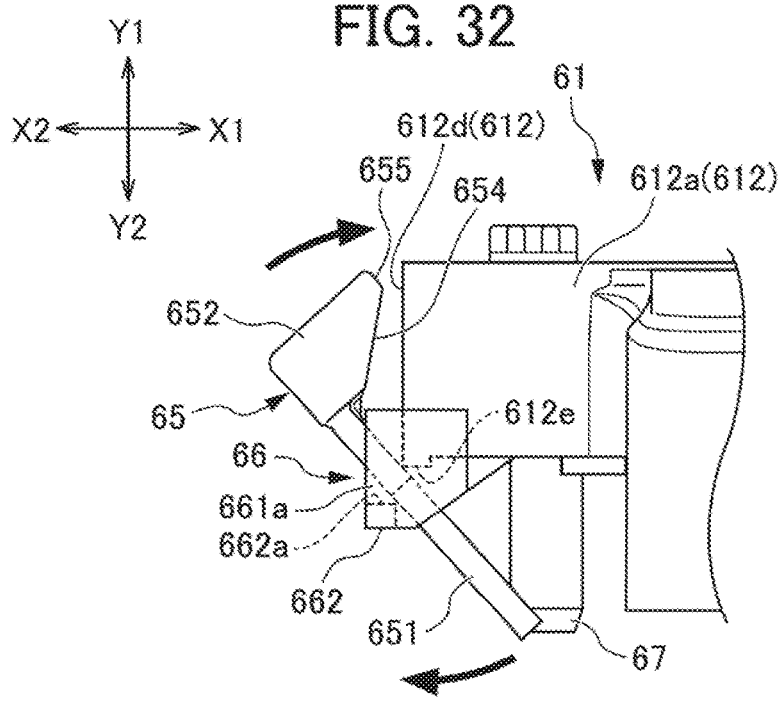
FIG. 32 is a diagram for explaining a step of mounting the working member to the guide hole of the intake member according to the embodiment of the present invention.

Next, a specific method of inserting the arm portion 651 of the choke lever 65 into the guide hole 66 will be described with reference to FIGS. 31 to 33. FIGS. 31 to 33 are diagrams for explaining one step of mounting the working member to the guide hole of the intake member according to the embodiment of the present invention. In the present embodiment, the choke lever 65 is mounted to the air cleaner case 61 by inserting the arm portion 651 into the guide hole 66.

Here, when the arm portion 651 is inserted into the guide hole 66, a wide portion 665 in the guide hole 66 can be used. The wide portion 665 is formed to be wider than the first fixing portion 663 and the second fixing portion 664 that sandwich and fix the arm portion 651. Therefore, it is possible to improve the mounting property of the choke lever 65.

As shown in FIGS. 13 to 15 and FIGS. 31 to 33, a cylindrical boss portion 67 which protrudes greatly toward the carburetor 60 side (opposite side to the air filter 62 and the direction Y2 side) is provided in the end wall portion 611 of the air cleaner case 61. The boss portion 67 configures a passage for feeding a gas containing the oil blown back from the carburetor 60 to the air filter 62 side through the opening 613 to the intake port 60a of the carburetor 60 again through the opening 613. Specifically, the boss portion 67 of the present embodiment is provided in the end wall portion 611 between the guide hole 66 and the opening 613 above the center of the opening 613 in the direction of gravity (direction Z1-Z2) of the air cleaner case 61.

As shown in FIG. 15, a communication flow path 68 that configures a passage for feeding a gas containing oil into the intake port 60a of the carburetor 60 together with the boss portion 67 is recessed on the surface of the end wall portion 611 on the air filter 62 side. One end portion 68a of the communication flow path 68 communicates with the boss portion 67, while the other end portion 68b of the communication flow path 68 is communicated with the opening 613. The communication flow path 68 extends downward from the one end portion 68a communicating with the boss portion 67, and extends toward the opening 613 side at substantially the same height as the opening 613. As shown in FIGS. 15 and 21, the other end portion 68b of the communication flow path 68 communicates with the opening 613 on the carburetor 60 side (direction Y2 side) of the closing surface by the valve body plate portion 641 of the choke valve 64. As shown in FIG. 12, FIG. 22, and FIG. 23, the communication flow path 68 is closed by the channel lid 681 over the entire length, and is isolated from the air filter 62. Therefore, the air-fuel mixture blown back from the carburetor 60 does not contaminate the air filter 62.

The boss portion 67 is disposed above the opening 613 in the direction of gravity. With this configuration, the oil contained in the gas from the carburetor 60 side can be guided to the opening 613 by the action of gravity. In the present embodiment, the boss portion 67 is disposed between the guide hole 66 and the opening 613. Therefore, any interference does not occur during the opening and closing movement of the valve body plate portion 641 of the choke valve 64, and moreover, it is possible to compactly form the air cleaner case 61.

However, the arm portion 651 interferes with the boss portion 67 when the arm portion 651 of the choke lever 65 is inserted from the guide hole 66 to place the engaging hole 653 in the mounting hole 618. Therefore, when the arm portion 651 of the choke lever 65 is first inserted along the end wall portion 611 from the wide portion 665 of the guide hole 66, the arm portion 651 of the choke lever 65 is inserted downward from the boss portion 67 so as to avoid the boss portion 67 (FIG. 31).

Next, the holding portion 652 side of the choke lever 65 is sloped toward the back wall portion 612d. As a result, the one end portion 651c side of the arm portion 651 is largely sloped so as to project toward the carburetor 60 side (direction Y2 side) (FIG. 32). Since the transfer frame portion 662 forming the guide hole 66 is displaced backward (in the direction X2) of the back wall portion 612d of the air cleaner case 61, the side edge portion 612e of the back wall portion 612d and the inner surface 662a of the transfer frame portion 662 are not opposed to each other with the arm portion 651 interposed therebetween. Therefore, the holding portion 652 side of the choke lever 65 can be easily sloped toward the back wall portion 612d. At this time, since the notch portion 654 of the holding portion 652 is substantially parallel to the back wall portion 612d, the holding portion 652 and the back wall portion 612d do not interfere with each other, and the arm portion 651 can be sloped to such a large extent that it can ride over the boss portion 67. Therefore, according to the opening/closing mechanism 6A, it is possible to greatly improve the mounting property of the choke lever 65.

Furthermore, at the same time as inclining the holding portion 652 side of the choke lever 65 toward the back wall portion 612d, the holding portion 652 side is moved to rotate downward around the pinching portion between the arm portions 651 and the guide hole 66 (FIG. 33). As a result, the arm portion 651 passes over the boss portion 67 and is disposed above the boss portion 67, and the engaging hole 653 is disposed so as to coincide with the mounting hole 618. At this time, since the curved portion 651a of the arm portion 651 is disposed above the boss portion 67, the boss portion 67 can be accommodated inside the curved portion 651a, and the boss portion 67 does not interfere with the movement operation of the choke lever 65.

It should be noted that the present invention is not limited to the above-mentioned embodiments, and variations and improvements within a range in which the object of the present invention can be achieved are included in the present invention. For example, in the present embodiment, the engaging shaft portion 644 is provided on the choke valve 64, and the engaging hole 653 is provided in the choke lever 65. However, the engaging shaft portion may be provided on the arm portion 651 of the choke lever 65, and an engaging hole may be provided in an engaging hole in the coupling plate portion 642 of the choke valve 64.

EXPLANATION OF REFERENCE NUMERALS 6a opening/closing mechanism
60 carburetor (vaporizer)
61 air cleaner case (intake member)
611 end wall portion
613 opening
62 air filter (filter part)
64 choke valve (opening/closing member)
65 choke lever (working member)
651 arm portion
651c one end (of the arm portion)
651d other end (of the arm portion)
652 holding portion
66 guide hole
663 first fixing portion
664 second fixing portion
665 wide portion
665a maximum width (of a wide portion)
665b first sloped portion
665c second sloped portion

The invention claimed is:

1. An opening/closing mechanism comprising:
an intake member that accommodates a filter part and has an opening leading to a carburetor at an end wall portion facing the filter part;
an opening/closing member that is disposed between the filter part and the end wall portion, and opens and closes the opening; and
a working member that is disposed on a side opposite to the opening/closing member with the end wall portion interposed therebetween,
wherein the working member includes an arm portion that extends along the end wall portion and is coupled with the opening/closing member at one end by sandwiching the end wall portion therebetween, and a holding portion that is provided at the other end of the arm portion,
the intake member has a guide hole into which the arm portion is inserted to guide movement of the arm portion,
the guide hole has a first fixing portion that fixes the arm portion on one side in a movement direction of the arm portion, and a second fixing portion that fixes the arm portion on the other side in the movement direction of the arm portion,
the first fixing portion and the second fixing portion include an inner edge of the guide hole, and
opening widths of the first fixing portion and the second fixing portion of the guide hole along a direction perpendicular to the movement direction of the arm portion are respectively equal to or less than a width of the arm portion along the direction perpendicular to the movement direction of the arm portion.

2. The opening/closing mechanism according to claim 1, wherein the guide hole includes a wide portion having a length equal to or greater than a length of the arm portion along a length direction, which is the movement direction of the arm portion, of the guide hole between the first fixing portion and the second fixing portion, and having a width greater than the width of the arm portion along the direction perpendicular to the movement direction of the arm portion.

3. The opening/closing mechanism according to claim 2, wherein the width of the wide portion is equal to or less than twice the width of the arm portion.

4. The opening/closing mechanism according to claim 2, wherein the wide portion includes a maximum width part of the wide portion having a maximum width along the direction perpendicular to the movement direction of the arm portion, a first sloped portion that couples the maximum width part of the wide portion with the first fixing portion, and a second sloped portion that couples the maximum width part of the wide portion with the second fixing portion.

5. The opening/closing mechanism according to claim 4, wherein a length of the maximum width part along the length direction of the guide hole is shorter than the length of the arm portion along the length direction of the guide hole.

6. The opening/closing mechanism according to claim 4, wherein an angle on an outside of the guide hole formed by the first fixing portion and the first sloped portion, and an angle on the outside of the guide hole formed by the second fixing portion and the second sloped portion are respectively larger than 90°.

7. The opening/closing mechanism according to claims 4, wherein an angle on an outside of the guide hole formed by the first fixing portion and the first sloped portion, and an angle on the outside of the guide hole formed by the second fixing portion and the second sloped portion differ from each other.

8. The opening/closing mechanism according to claims 1, wherein a length of the first fixing portion and/or the second fixing portion along a length direction, which is the movement direction of the arm portion, of the guide hole is equal to or less than the length of the arm portion along the length direction of the guide hole.

9. The opening/closing mechanism according to claim 1, wherein a length of the first fixing portion or the second fixing portion along a length direction, which is the movement direction of the arm portion, of the guide hole is equal to a length of the arm portion along the length direction of the guide hole.

10. The opening/closing mechanism according to claim 1, wherein lengths of the first fixing portion and the second fixing portion along a length direction, which is the movement direction of the arm portion, of the guide hole are equal to a length of the arm portion along the length direction of the guide hole.

11. The opening/closing mechanism according to claim 1, wherein the first fixing portion and the second fixing portion of the guide hole are disposed on opposite sides of the guide hole in the movement direction of the arm portion, and are spatially and directly communicated with each other along a path that extends in the movement direction of the arm portion.

* * * * *